(12) United States Patent
Chiang

(10) Patent No.: US 8,358,517 B2
(45) Date of Patent: Jan. 22, 2013

(54) SWITCHING POWER CONVERSION CIRCUIT AND POWER SUPPLY USING SAME

(75) Inventor: Chin-Tsai Chiang, Taoyuan Hsien (TW)

(73) Assignee: Delta Electonics, Inc., Taoyuan Hsien (TW)

( * ) Notice: Subject to any disclaimer, the term of this patent is extended or adjusted under 35 U.S.C. 154(b) by 369 days.

(21) Appl. No.: 12/836,575

(22) Filed: Jul. 14, 2010

(65) Prior Publication Data

US 2011/0013431 A1 Jan. 20, 2011

(30) Foreign Application Priority Data

Jul. 17, 2009 (TW) ................ 98124296 A

(51) Int. Cl.
*H02M 3/335* (2006.01)
*H02M 3/24* (2006.01)

(52) U.S. Cl. .......... 363/21.12; 363/20; 363/21.01; 363/21.15; 363/95; 363/97; 323/902

(58) Field of Classification Search .............. 363/20, 363/21.01, 21.12, 21.15, 95, 97; 323/902
See application file for complete search history.

(56) References Cited

U.S. PATENT DOCUMENTS

| | | | | |
|---|---|---|---|---|
| 6,385,061 B1 * | 5/2002 | Turchi et al. | ............ | 363/21.15 |
| 6,519,165 B2 * | 2/2003 | Koike | ............ | 363/21.12 |
| 7,457,138 B2 * | 11/2008 | Sheng et al. | ............ | 363/21.12 |
| 7,859,864 B2 * | 12/2010 | Shiroyama | ............ | 363/21.12 |
| 7,911,815 B2 * | 3/2011 | Wang et al. | ............ | 363/21.12 |
| 7,965,523 B2 * | 6/2011 | Yamaguchi et al. | ....... | 363/21.12 |
| 8,149,601 B2 * | 4/2012 | Xiaowu et al. | ............ | 363/21.12 |
| 8,194,425 B2 * | 6/2012 | Park et al. | ............ | 363/21.18 |
| 2007/0253228 A1 * | 11/2007 | Morota et al. | ............ | 363/21.12 |
| 2007/0274107 A1 * | 11/2007 | Garner et al. | ............ | 363/21.12 |
| 2008/0037294 A1 * | 2/2008 | Indika de Silva et al. | . | 363/21.12 |
| 2008/0298094 A1 * | 12/2008 | Cuadra et al. | ............ | 363/21.12 |
| 2009/0262561 A1 * | 10/2009 | Mayell et al. | ............ | 363/21.12 |
| 2010/0085779 A1 * | 4/2010 | Hisada | ............ | 363/21.12 |
| 2010/0165671 A1 * | 7/2010 | Coulson et al. | ............ | 363/21.12 |
| 2012/0069609 A1 * | 3/2012 | Christophe et al. | ........ | 363/21.12 |

\* cited by examiner

*Primary Examiner* — Bao Q Vu

(57) ABSTRACT

A switching power conversion circuit receives an input voltage and generates an output voltage to a system circuit. The switching power conversion circuit includes a power circuit, a feedback circuit, a control circuit, and an initiation circuit. The power circuit includes a first switch circuit. The feedback circuit generates a feedback signal according to a power-status signal and the output voltage. The first switching circuit is conducted or shut off according to the feedback signal under control of the control circuit, so that the input voltage is converted into the output voltage and the first auxiliary voltage by the power circuit. If the power-status signal is in an off status, a ratio of the feedback signal to the output voltage is equal to a first feedback ratio and the magnitude of the first auxiliary voltage is lower than a normal operating voltage value, so that the control circuit is disabled.

26 Claims, 16 Drawing Sheets

SWITCHING POWER CONVERSION CIRCUIT AND POWER SUPPLY USING SAME

CLAIM OF PRIORITY

This application claims priority to Taiwanese Patent Application No. 098124296 filed on Jul. 17, 2009.

FIELD OF THE INVENTION

The present invention relates to a power conversion circuit, and more particularly to a switching power conversion circuit and a power supply using the same.

BACKGROUND OF THE INVENTION

With increasing industrial development, diverse electronic devices are used to achieve various purposes. An electronic device comprises a plurality of electronic components. Generally, different kinds of electronic components are operated by using different voltages.

As known, a power supply is essential for many electronic devices such as personal computers, industrial computers, servers, communication products or network products. Usually, the user may simply plug a power supply into an AC wall outlet commonly found in most homes or offices so as to receive an AC voltage. The power supply will convert the AC voltage into a regulated DC output voltage for powering the electronic device. The regulated DC output voltage is transmitted to the electronic device through a power cable.

Generally, power supply apparatuses are classified into two types, i.e. a linear power supply and a switching power supply (SPS). A linear power supply principally comprises a transformer, a diode rectifier and a capacitor filter. The linear power supply is advantageous due to its simplified circuitry and low fabricating cost. Since the linear power supply has bulky volume, the linear power supply is not applicable to a slim-type electronic device. In addition, the converting efficiency of the linear power supply is too low to comply with the power-saving requirements. In comparison with the linear power supply, the switching power supply has reduced volume but increased converting efficiency. That is, the switching power supply is applicable to the slim-type electronic device and could comply with the power-saving requirements.

Although the switching power supply has higher converting efficiency, there are still some drawbacks. For example, even if the electrical energy is not required to be transmitted to the system circuit of the electronic device, the switching power supply is continuously operated to issue an output voltage having the rated voltage value. In other words, the switching power supply continuously consumes electrical energy even if no electrical energy is transmitted to the system circuit of the electronic device. Under this circumstance, the conventional switching power supply fails to meet the power-saving requirement.

Therefore, there is a need of providing an improved power conversion circuit so as to obviate the drawbacks encountered from the prior art.

SUMMARY OF THE INVENTION

It is an object of the present invention to provide a switching power conversion circuit and a power supply having reduced power consumption when the system circuit of the electronic device or load is not in use, thereby achieving a power-saving purpose.

In accordance with an aspect of the present invention, there is provided a switching power conversion circuit for receiving an input voltage and generating an output voltage to a system circuit. The switching power conversion circuit includes a power circuit, a feedback circuit, a control circuit, and an initiation circuit. The power circuit includes a first switch circuit. The input voltage is converted into the output voltage and a first auxiliary voltage by alternately conducting and shutting off the first switching circuit. The feedback circuit is connected to the power circuit for generating a feedback signal according to a power-status signal issued by the system circuit and the output voltage. The control circuit is connected to the first switching circuit and the feedback circuit. The first switching circuit is conducted or shut off according to the feedback signal under control of the control circuit, so that the input voltage is converted into the output voltage and the first auxiliary voltage by the power circuit. The initiation circuit is connected to the system circuit and the control circuit. An initiation voltage is issued by the initiation circuit according to the power-status signal. If the power-status signal is in an off status, a ratio of the feedback signal to the output voltage is equal to a first feedback ratio and the magnitude of the first auxiliary voltage is lower than a normal operating voltage value, so that the control circuit is disabled.

In accordance with another aspect of the present invention, there is provided a switching power conversion circuit for receiving an input voltage and generating an output voltage. The output voltage is transmitted to a system circuit of an electronic device through a power connector. The switching power conversion circuit includes a power circuit, a feedback circuit, a power-status detecting circuit, and a control circuit. The power circuit includes a first switch circuit. The input voltage is converted into the output voltage and a first auxiliary voltage by alternately conducting and shutting off the first switching circuit. The output voltage and the first auxiliary voltage are respectively outputted from a first power output terminal and a second power output terminal of the power circuit. The feedback circuit is connected to the power circuit for generating a feedback signal according to the output voltage. The power-status detecting circuit is connected to the first power output terminal of the power circuit for discriminating whether electrical energy of the switching power conversion circuit needs to be transmitted to the system circuit, thereby generating a corresponding power-status detecting signal. The control circuit is connected to the first switching circuit, the feedback circuit and the power-status detecting circuit. The control circuit generates a pulse width modulation control signal according to the power-status detecting signal and the feedback signal. The first switching circuit is conducted or shut off according to the pulse width modulation control signal under control of the control circuit, so that the input voltage is converted into the output voltage and the first auxiliary voltage by the power circuit. If the power-status detecting signal is in an off status, the first control circuit is disabled or intermittently enabled, so that the magnitudes of the output voltage and the first auxiliary voltage are lower than the rated values thereof or equal to zero.

In accordance with a further aspect of the present invention, there is provided a switching power conversion circuit for receiving an input voltage and generating an output voltage to a system circuit. The switching power conversion circuit includes a power circuit, a feedback circuit, and a controlling unit. The power circuit includes a first switch circuit. The input voltage is converted into the output voltage and a first auxiliary voltage by alternately conducting and shutting off the first switching circuit. The output voltage and the first auxiliary voltage are respectively outputted from a first power output terminal and a second power output terminal of the power circuit. The feedback circuit is connected to the power circuit for generating a feedback signal according to the output voltage. The controlling unit is connected to the first switching circuit and the feedback circuit for controlling the first switching circuit to be conducted or shut off according to the feedback signal and on/off statuses of the system circuit, so that the input voltage is converted into the output voltage and the first auxiliary voltage by the power circuit. If the system circuit is in an off status, the first control circuit is disabled or intermittently enabled, so that the magnitudes of the output voltage and the first auxiliary voltage are lower than the rated values thereof or equal to zero.

In accordance with a further aspect of the present invention, there is provided a power supply comprising a switching power conversion circuit for receiving an input voltage and generating an output voltage. The output voltage is transmitted to a system circuit of an electronic device through a power connector. The switching power conversion circuit comprises: a power circuit comprising a first switch circuit, wherein the input voltage is converted into the output voltage and a first auxiliary voltage by alternately conducting and shutting off the first switching circuit, and the output voltage and the first auxiliary voltage are respectively outputted from a first power output terminal and a second power output terminal of the power circuit; a feedback circuit connected to the power circuit for generating a feedback signal according to the output voltage; and a controlling unit connected to the first switching circuit, the system circuit and the feedback circuit for controlling the first switching circuit to be conducted or shut off according to the feedback signal and on/off statuses or power-status of the system circuit, so that the input voltage is converted into the output voltage and the first auxiliary voltage by the power circuit. When the power-status of the system circuit is in an off status, the controlling unit controls the first switching circuit to stop operating or to be alternately conducted and shut off, so that the magnitudes of the output voltage and the first auxiliary voltage are lower than the rated values thereof or equal to zero.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
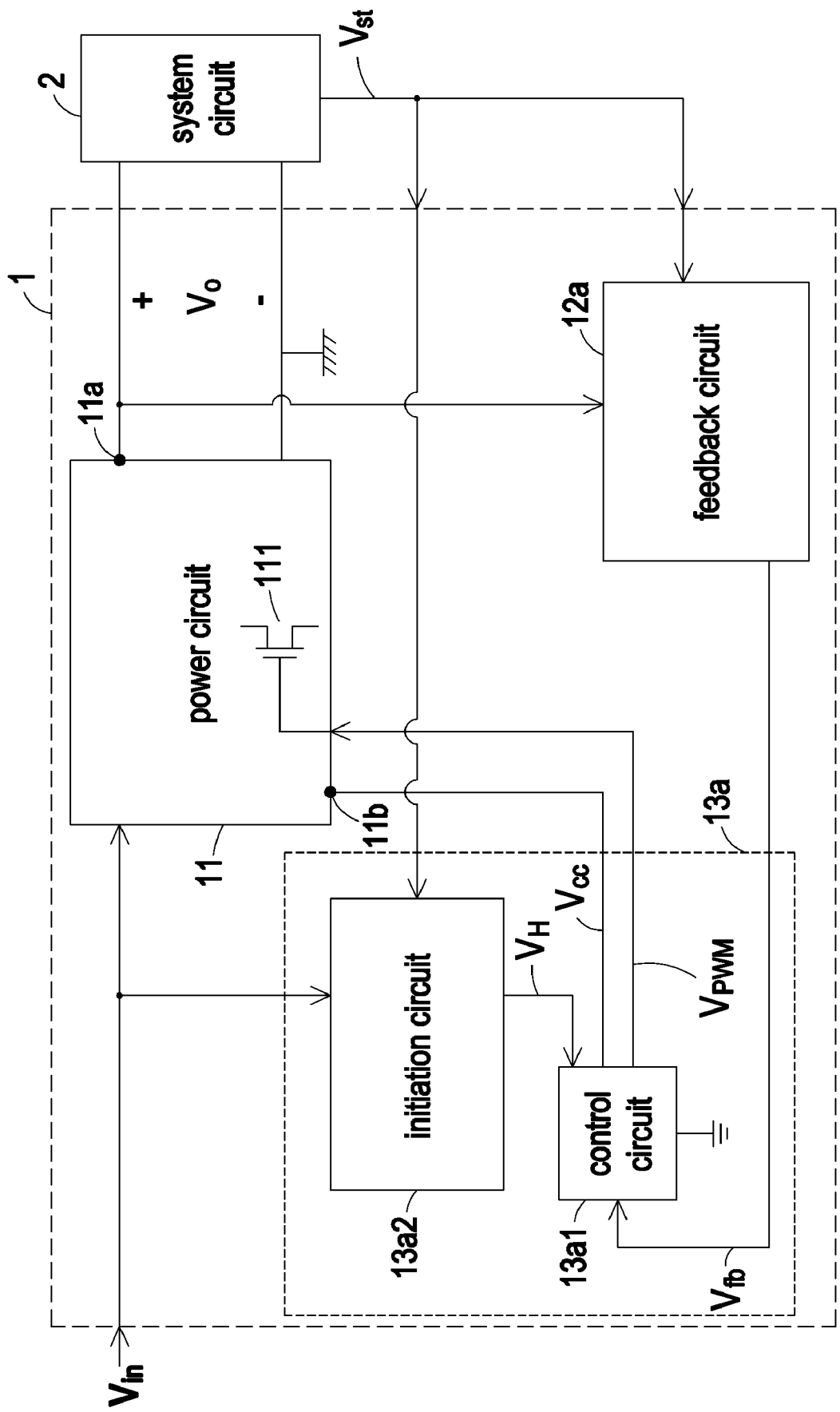
FIG. 1 is a schematic circuit diagram of a switching power conversion circuit according to a first embodiment of the present invention.

FIG. 1 is a schematic circuit diagram of a switching power conversion circuit according to a first embodiment of the present invention. The switching power conversion circuit 1 is used for receiving an input voltage $V_{in}$ and generating an output voltage $V_o$ to a system circuit 2 of an electronic device. As shown in FIG. 1, the switching power conversion circuit 1 comprises a power circuit 11, a feedback circuit 12a and a controlling unit 13a. In this embodiment, the controlling unit 13a comprises a control circuit 13a1 and an initiation circuit 13a2. The power circuit 11 comprises a first switching circuit 111. By alternatively conducting or shutting off the first switching circuit 111, the input voltage $V_{in}$ is converted into the output voltage $V_o$ and a first auxiliary voltage $V_{cc}$, which are respectively outputted from a first power terminal 11a and a second power output terminal 11b. The feedback circuit 12a is connected to the first power terminal 11a of the power circuit 11 and the control circuit 13a1. According to a power-status signal $V_{st}$ issued by the system circuit and the output voltage $V_o$, the feedback circuit 12a generates a feedback signal $V_{fb}$. The control circuit 13a1 is connected to the control terminal of the first switching circuit 111 and the output terminal of the feedback circuit 12a. According to the feedback signal $V_{fb}$, the control circuit 13a1 generates a pulse width modulation control signal $V_{PWM}$. According to the pulse width modulation control signal $V_{PWM}$, the first switching circuit 111 is conducted or shut off under control of the control circuit 13a1. As such, the input voltage $V_{in}$ is converted into the output voltage $V_o$ and the first auxiliary voltage $V_{cc}$. The initiation circuit 13a2 is connected to the power input terminal of the power circuit 11, the system circuit 2 and the control circuit 13a1. According to the power-status signal $V_{st}$, the input voltage $V_{in}$ is converted into an initiation voltage $V_H$ by the initiation circuit 13a2. The initiation voltage $V_H$ is transmitted to the control circuit 13a1, thereby controlling operations of the control circuit 13a1.

Figure 2:
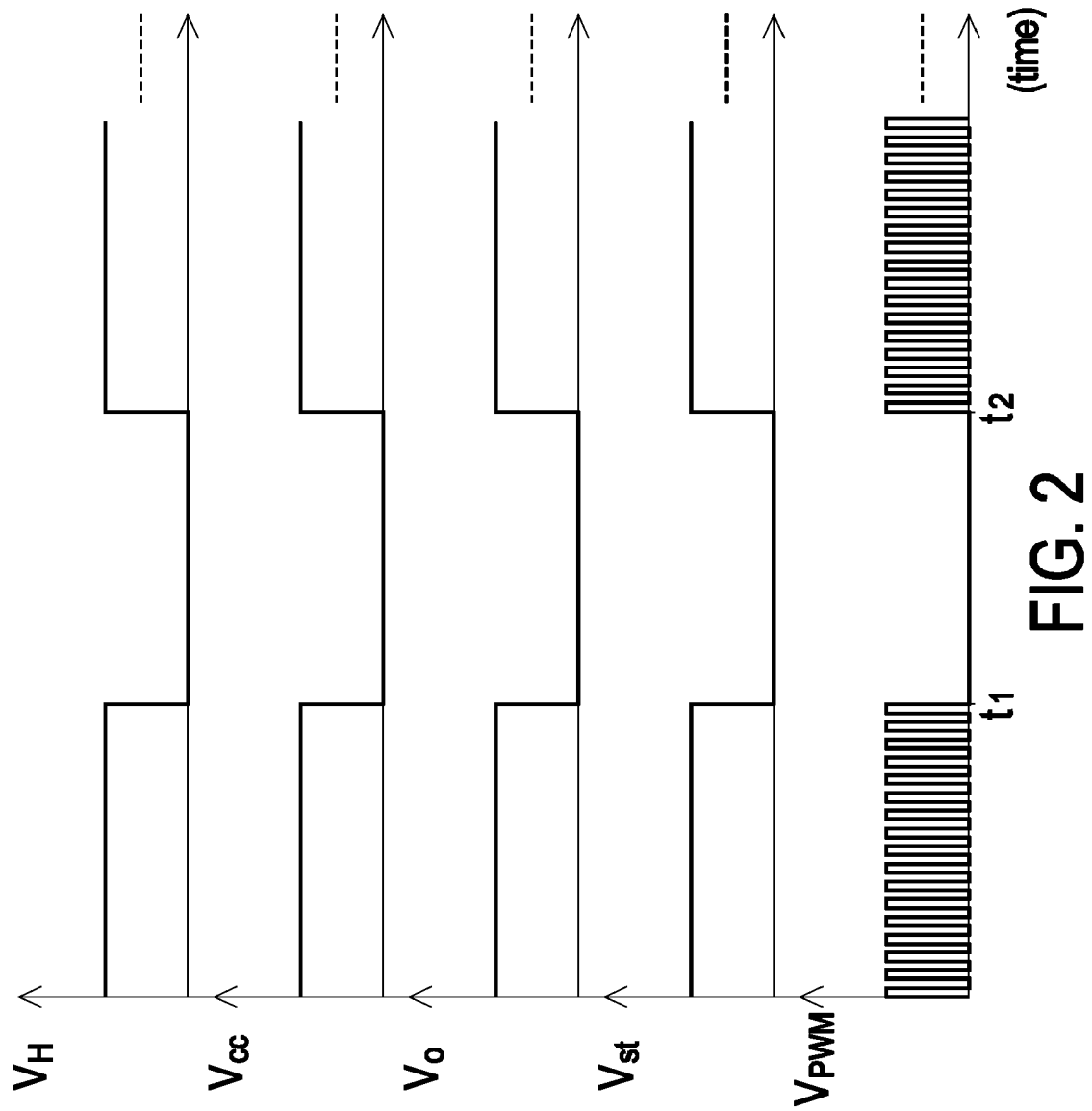
FIG. 2 is a timing waveform diagram schematically illustrating the corresponding voltage signals processed in the switching power conversion circuit of FIG. 1.

FIG. 2 is a timing waveform diagram schematically illustrating the corresponding voltage signals processed in the switching power conversion circuit of FIG. 1.

Before the time spot $t_1$, the power-status signal $V_{st}$ is in a high-level status, the electrical energy of the switching power conversion circuit 1 should be provided to the system circuit 2. Meanwhile, according to the output voltage $V_o$, the feedback circuit 12a generates a feedback signal $V_{fb}$. According to the feedback signal $V_{fb}$, the output voltage $V_o$ and the first auxiliary voltage $V_{cc}$ outputted from the power circuit 11 are maintained at the rated values under control of the control circuit 13a1. As such, the output voltage $V_o$ and the first auxiliary voltage $V_{cc}$ could provide electrical energy to the system circuit 2 and the control circuit 13a1, respectively. If the magnitude of the first auxiliary voltage $V_{cc}$ provided to the control circuit 13a1 is higher than the normal operating voltage value $V_{on}$, the control circuit 13a1 is continuously operated to generate a pulse width modulation control signal $V_{PWM}$. According to the pulse width modulation control signal $V_{PWM}$, the first switching circuit 111 is conducted or shut off under control of the control circuit 13a1. As such, the input voltage $V_{in}$ is converted into the output voltage $V_o$ and the first auxiliary voltage $V_{cc}$.

At the time spot $t_1$, the power-status signal $V_{st}$ is switched from the high-level status to a zero-level or low-level status (i.e. an off status). It is meant that the electrical energy of the switching power conversion circuit 1 needs not to be provided to the system circuit 2. Meanwhile, according to the output voltage $V_o$, the feedback circuit 12a generates a feedback signal $V_{fb}$. Since the magnitude of the first auxiliary voltage $V_{cc}$ issued by the power circuit 11 is lower than the normal operating voltage value $V_{on}$, the control circuit 13a1 is disabled. As such, the magnitudes of the output voltage $V_o$ and the first auxiliary voltage $V_{cc}$ are zero. Since the power-status signal $V_{st}$ is under the off status, the magnitude of the initiation voltage $V_H$ is zero. Even if the electrical energy of the input voltage $V_{in}$ is continuously transmitted to the initiation circuit 13a2, the control circuit 13a1 fails to be enabled according to the zero voltage value of initiation voltage $V_H$. That is, the control circuit 13a1 is disabled from the time spot $t_1$ to the time spot $t_2$. During this time interval, the magnitudes of the output voltage $V_o$ and the first auxiliary voltage $V_{cc}$ are zero and the switching power conversion circuit 1 stops providing electrical energy to the system circuit 2.

At the time spot $t_2$, the power-status signal $V_{st}$ is switched from the off status to the high-level status (i.e. an on status). According to the power-status signal $V_{st}$ in the on status, the electrical energy of the input voltage $V_{in}$ is transmitted to the control circuit 13a1 through the initiation circuit 13a2. That is, the magnitude of the initiation voltage $V_H$ is not zero. At this moment, the electrical energy of the initiation voltage $V_H$ is transmitted to the second capacitor $C_2$ (see FIG. 3) of the power circuit 11 through the control circuit 13a1. Under this circumstance, the magnitude of the first auxiliary voltage $V_{cc}$ is increased to be higher than the normal operating voltage value $V_{on}$, so that the control circuit 13a1 is enabled. According to the feedback signal $V_{fb}$, the control circuit 13a1 generates a pulse width modulation control signal $V_{PWM}$. According to the pulse width modulation control signal $V_{PWM}$, the first switching circuit 111 is conducted or shut off under control of the control circuit 13a1. Meanwhile, according to the output voltage $V_o$, the feedback circuit 12a generates a feedback signal $V_{fb}$. According to the feedback signal $V_{fb}$, the output voltage $V_o$ and the first auxiliary voltage $V_{cc}$ outputted from the power circuit 11 are maintained at the rated values under control of the control circuit 13a1. As such, the output voltage $V_o$ and the first auxiliary voltage $V_{cc}$ could provide electrical energy to the system circuit 2 and the control circuit 13a1, respectively.

Figure 3:
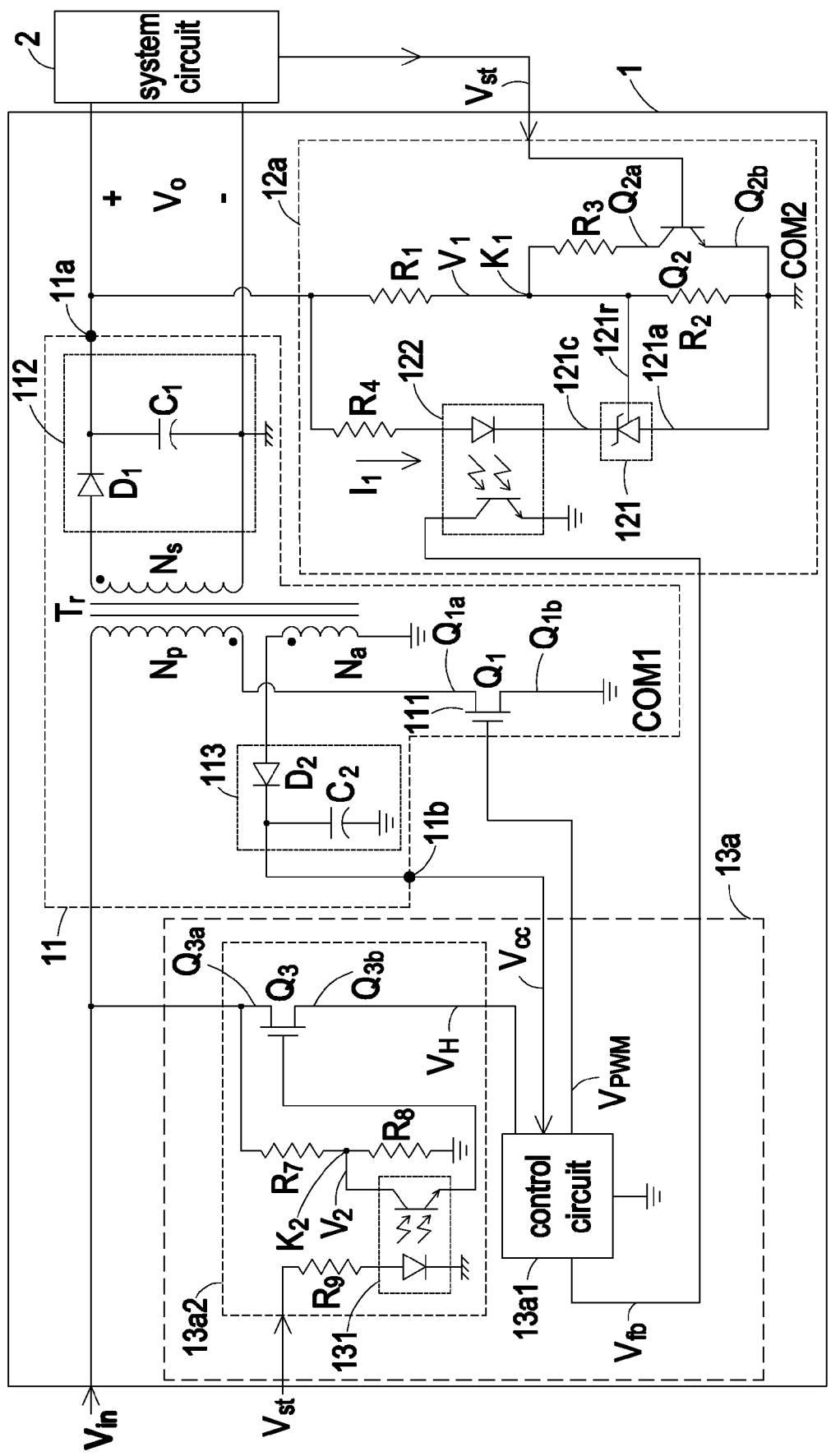
FIG. 3 is a schematic detailed circuit diagram illustrating a switching power conversion circuit of FIG. 1.

FIG. 3 is a schematic detailed circuit diagram illustrating a switching power conversion circuit of FIG. 1. In this embodiment, the power circuit comprises a first switching circuit 111, a first rectifier and filter circuit 112, a second rectifier and filter circuit 113 and a transformer $T_r$. The transformer $T_r$ comprises a primary winding coil $N_p$, a secondary winding coil $N_s$ and an auxiliary winding coil $N_a$. The first switching circuit 111 comprises a first switch element $Q_1$. A first end of the primary winding coil $N_p$ of the transformer $T_r$ is connected to a first terminal $Q_{1a}$ of the first switch element $Q_1$. A second terminal $Q_{1b}$ of the first switch element $Q_1$ is connected to a common terminal $COM_1$. A control terminal of the first switch element $Q_1$ is connected to the control circuit 13a1. According to the pulse width modulation control signal $V_{PWM}$ generated by the control circuit 13a1, the first switch element $Q_1$ is conducted or shut off. As such, the electrical energy of the input voltage $V_{in}$ is transmitted to the secondary winding coil $N_s$ and an auxiliary winding coil $N_a$ of the transformer $T_r$ through the primary winding coil $N_p$, and then respectively rectified and filtered by the first rectifier and filter circuit 112 and the second rectifier and filter circuit 113, thereby generating the output voltage $V_o$ and the first auxiliary voltage $V_{cc}$.

The first rectifier and filter circuit 112 is interconnected between the secondary winding coil $N_s$ of transformer $T_r$ and the system circuit 2. The first rectifier and filter circuit 112 comprises a first diode $D_1$ and a first capacitor $C_1$. The anode of the first diode $D_1$ is connected to the secondary winding coil $N_s$ of transformer $T_r$. The cathode of the first diode $D_1$ is connected to the system circuit 2 and a first end of the first capacitor $C_1$. The first capacitor $C_1$ is interconnected between the first power terminal 11a of the power circuit 11 and a second common terminal $COM_2$.

The second rectifier and filter circuit 113 is interconnected between the auxiliary winding coil $N_a$ of the transformer $T_r$ and the control circuit 13a1. The second rectifier and filter circuit 113 comprises a second diode $D_2$ and a second capacitor $C_2$. The anode of the second diode $D_2$ is connected to the auxiliary winding coil $N_a$ of the transformer $T_r$. The cathode of the second diode $D_2$ is connected to the control circuit 13a1 and a first end of the second capacitor $C_2$. The second capacitor $C_2$ is interconnected between the second power terminal 11b of the power circuit 11 and a first common terminal $COM_1$.

The feedback circuit 12a comprises a first resistor $R_1$, a second resistor $R_2$, a third resistor $R_3$, a fourth resistor $R_4$, a second switch element $Q_2$, a first isolating element 122 and a three-terminal adjustable voltage regulator 121. The first resistor $R_1$ is interconnected between the first power terminal 11a of the power circuit 11 and a first connecting node $K_1$. The second resistor $R_2$ is interconnected between the first connecting node $K_1$ and the second common terminal $COM_2$. The first resistor $R_1$ and the second resistor $R_2$ are serially connected with each other, thereby collectively defining a first voltage-division circuit. The output voltage $V_o$ is subject to voltage division by the first voltage-division circuit, thereby generating a first divided voltage $V_1$ at a first reference terminal 121r of the three-terminal adjustable voltage regulator 121.

An example of the first isolating element 122 includes but is not limited to an opto-isolator. The output side of the first isolating element 122 is connected to the control circuit 13a1. According to the magnitude of a first current $I_1$ flowing into the input side of the first isolating element 122, the first isolating element 122 generates the corresponding feedback signal $V_{fb}$. The input side of the first isolating element 122 and the fourth resistor $R_4$ are serially interconnected between the cathode 121c of the three-terminal adjustable voltage regulator 121 and the first power terminal 11a of the power circuit 11. The fourth resistor $R_4$ is used for limiting the first current $I_1$ flowing into the input side of the first isolating element 122 or the cathode 121c of the three-terminal adjustable voltage regulator 121. In other words, the serial connection between the fourth resistor $R_4$ and the first isolating element 122 could achieve the purpose of limiting the magnitude of the first current $I_1$. In some embodiments, the locations of the fourth resistor $R_4$ and the first isolating element 122 are exchanged.

An example of the three-terminal adjustable voltage regulator 121 is a LM317 IC (National Semiconductor). The anode 121a of the three-terminal adjustable voltage regulator 121 is connected to the second common terminal $COM_2$. The first reference terminal 121r of the three-terminal adjustable voltage regulator 121 is connected to the first connecting node $K_1$. According to the first divided voltage $V_1$ and a first reference voltage value (e.g. 1.25V) of the three-terminal adjustable voltage regulator 121, the magnitude of the first current $I_1$ is automatically adjusted by the three-terminal adjustable voltage regulator 121. As such, the output side of the first isolating element 122 generates the feedback signal $V_{fb}$ according to the output voltage $V_o$.

The third resistor $R_3$ and the second switch element $Q_2$ are interconnected between the both terminals of the second resistor $R_2$. A control terminal of the second switch element $Q_2$ is connected to the system circuit 2. In a case that the second switch element $Q_2$ is conducted in response to the power-status signal $V_{st}$ in the high-level status, the third resistor $R_3$ and the second resistor $R_2$ are connected with each other in parallel. A first end of the third resistor $R_3$ is connected to a first terminal $Q_{2a}$ of the second switch element $Q_2$. A second end of the third resistor $R_3$ is connected to the first connecting node $K_1$. A second terminal $Q_{2b}$ of the second switch element $Q_2$ is connected to the second common terminal $COM_2$.

In this embodiment, the initiation circuit 13a2 comprises a seventh resistor $R_7$, an eighth resistor $R_8$, a ninth resistor $R_9$, a second isolating element 131 and a third switch element $Q_3$. The seventh resistor $R_7$ is interconnected between the power input terminal of the power circuit 11 and a second connecting node $K_2$. The eighth resistor $R_8$ is interconnected between the second connecting node $K_2$ and the first common terminal $COM_1$. The seventh resistor $R_7$ and the eighth resistor $R_8$ are serially connected with each other, thereby collectively defining a first voltage-division circuit. The input voltage $V_{in}$ is subject to voltage division by the second voltage-division circuit, thereby generating a second divided voltage $V_2$ at the second connecting node $K_2$. A first terminal $Q_{3a}$ of the third switch element $Q_3$ is connected to the power input terminal of the power circuit 11. A second terminal $Q_{3b}$ of the third switch element $Q_3$ is connected to the control circuit 13a1. The output side of the second isolating element 131 is interconnected to a control terminal of the third switch element $Q_3$ and the second connecting node $K_2$. The input side of the second isolating element 131 and the ninth resistor $R_9$ are serially interconnected between the system circuit 2 and the second common terminal $COM_2$. An example of the second isolating element 131 includes but is not limited to an opto-isolator.

If the power-status signal $V_{st}$ is in a high-level status, the second divided voltage $V_2$ is transmitted to the control terminal of the third switch element $Q_3$ through the output side of the second isolating element 131, so that the electrical energy of the input voltage $V_{in}$ is transmitted to the control circuit 13a1. At this moment, the electrical energy of the initiation voltage $V_H$ is transmitted to the second capacitor $C_2$ of the power circuit 11 through the control circuit 13a1. Under this circumstance, the magnitude of the first auxiliary voltage $V_{cc}$ is increased to be higher than the normal operating voltage value $V_{on}$, so that the control circuit 13a1 is enabled. On the other hand, if the power-status signal $V_{st}$ is in a zero-level or low-level status, the second divided voltage $V_2$ fails to be transmitted to the control terminal of the third switch element $Q_3$ through the output side of the second isolating element 131. At this moment, the magnitude of the initiation voltage $V_H$ is zero and thus the control circuit 13a1 is disabled.

Moreover, if the power-status signal $V_{st}$ is in a zero-level or low-level status, the second switch element $Q_2$ is shut off, and thus the third resistor $R_3$ and the second resistor $R_2$ are not connected with each other in parallel. The ratio of feedback signal $V_{fb}$ to the output voltage $V_o$ is referred to a first feedback ratio. The ratio of the first divided voltage $V_1$ to the output voltage $V_o$ is referred to a first divided voltage ratio $A_1$. The relation between the first divided voltage $V_1$ and the output voltage $V_o$ is deduced as follows:

$$V_1 = \frac{R_2}{R_1 + R_2} \cdot V_o = A_1 \cdot V_o$$

If the power-status signal $V_{st}$ is in a high-level status, the second switch element $Q_2$ is conducted, and thus the third resistor $R_3$ and the second resistor $R_2$ are connected with each other in parallel. At this moment, the ratio of feedback signal $V_{fb}$ to the output voltage $V_o$ is referred to a second feedback ratio. The ratio of the second divided voltage $V_2$ to the output voltage $V_o$ is referred to a second divided voltage ratio $A_2$. The relation between the first divided voltage $V_1$ and the output voltage $V_o$ is deduced as follows:

$$V_1 = \frac{(R_2 // R_3)}{R_1 + (R_2 // R_3)} \cdot V_o = A_2 \cdot V_o$$

Since the first divided voltage ratio $A_1$ is greater than the second divided voltage ratio $A_2$, the first feedback ratio is greater than the second feedback ratio. If the power-status signal $V_{st}$ is in a high-level status (i.e. an on status), the output voltage $V_o$ and the first auxiliary voltage $V_{cc}$ outputted from the power circuit 11 are maintained at the rated values under control of the control circuit 13a1 according to the second feedback ratio of the second divided voltage $V_2$ to the output voltage $V_o$. Whereas, if the power-status signal $V_{st}$ is in a zero-level or low-level status (i.e. an off status), the magnitude of the first auxiliary voltage $V_{cc}$ is increased to be lower than the normal operating voltage value $V_{on}$ under control of the control circuit 13a1 according to the ratio of the first divided voltage $V_1$ to the output voltage $V_o$. Under this circumstance, the control circuit 13a1 is disabled.

Figure 4:
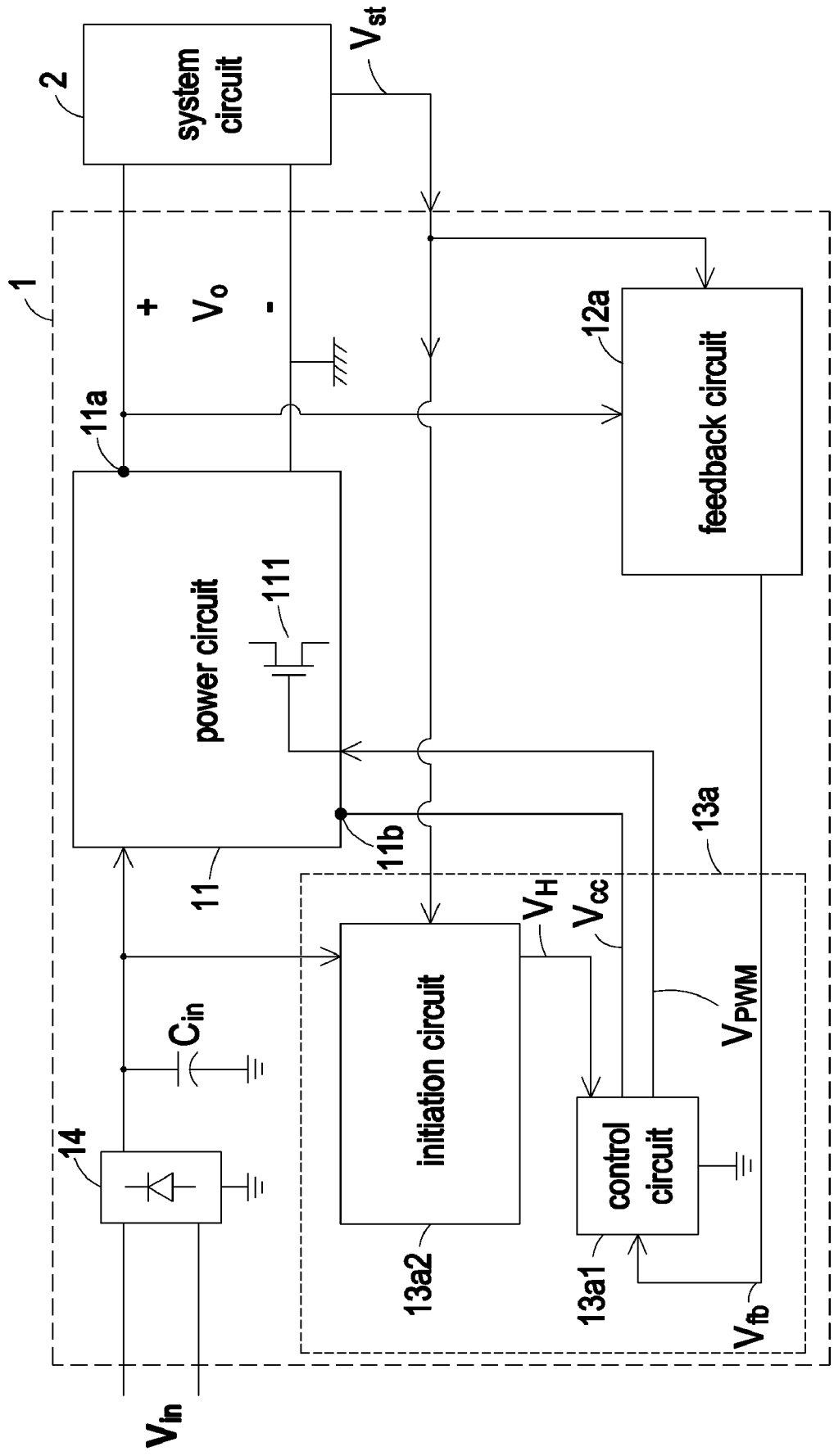
FIG. 4 is a schematic circuit diagram of a switching power conversion circuit according to a second embodiment of the present invention.

FIG. 4 is a schematic circuit diagram of a switching power conversion circuit according to a second embodiment of the present invention. In comparison with FIG. 1, the switching power conversion circuit 1 of FIG. 4 further comprises an input rectifier circuit 14 and an input capacitor $C_{in}$. The input rectifier circuit 14 is connected to the power input terminal of the power circuit 11 for rectifying an AC input voltage $V_{in}$ into a DC form. The input capacitor $C_{in}$ is interconnected between the power input terminal of the power circuit 11 and the first common terminal $COM_1$.

Figure 5:
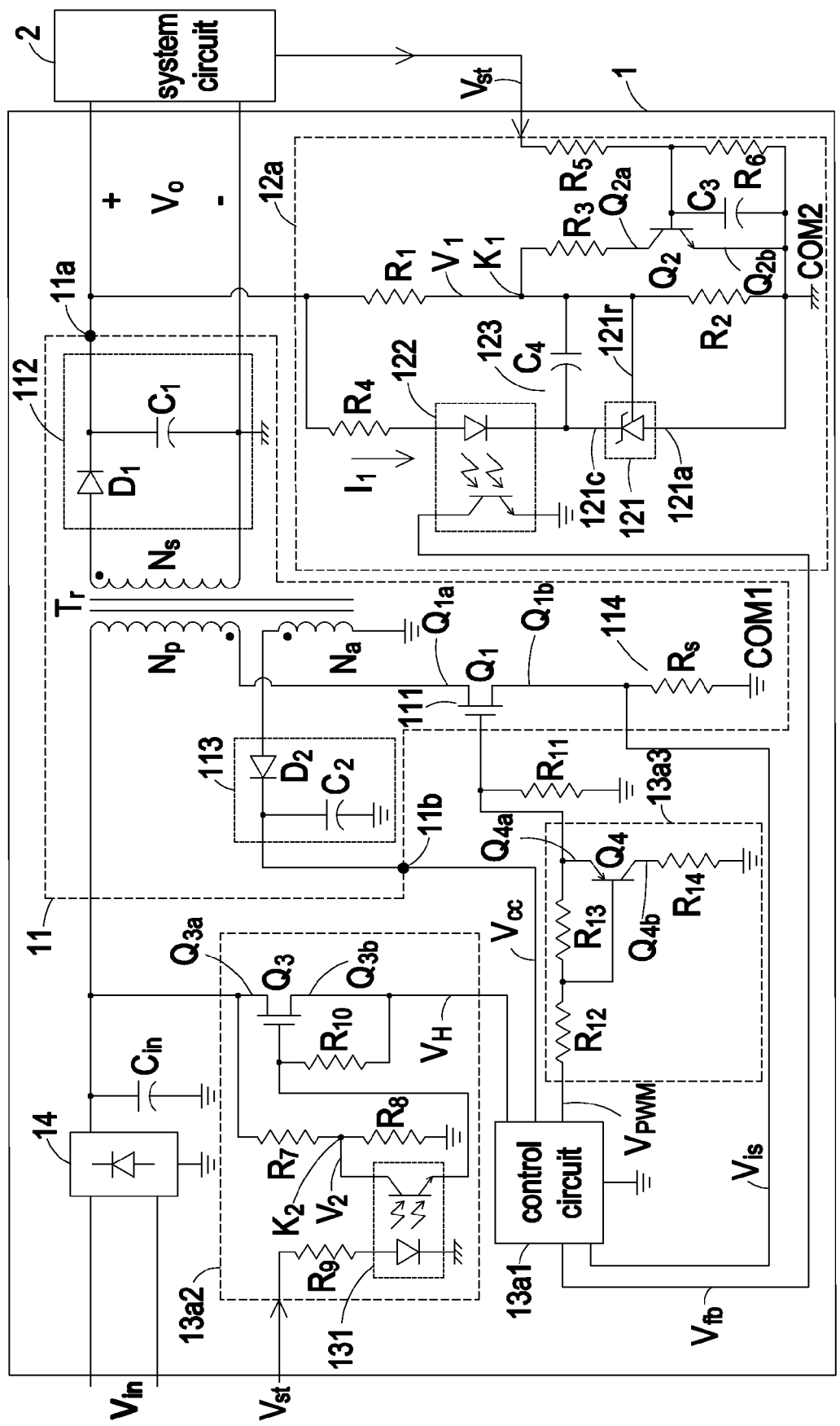
FIG. 5 is a schematic detailed circuit diagram illustrating a switching power conversion circuit of FIG. 4.

FIG. 5 is a schematic detailed circuit diagram illustrating a switching power conversion circuit of FIG. 4. In comparison with FIG. 3, the switching power conversion circuit 1 of FIG. 5 further comprises a current-detecting circuit 114, an input rectifier circuit 14, an accelerating circuit 13a3, an input capacitor $C_{in}$, a fifth resistor $R_5$, a sixth resistor $R_6$, a tenth resistor $R_{10}$, an eleventh resistor $R_{11}$, a third capacitor $C_3$ and a fourth capacitor $C_4$. The current-detecting circuit 114 comprises a detecting resistor $R_s$. The detecting resistor $R_s$ is interconnected between the second terminal $Q_{1b}$ of the first switch element $Q_1$ and the first common terminal $COM_1$. When the first switch element $Q_1$ is conducted, the magnitude of current flowing through the first switch element $Q_1$ is detected by the current-detecting circuit 114. As such, the current-detecting circuit 114 generates a corresponding current-detecting signal $V_{is}$ to the control circuit 13a1. The input rectifier circuit 14 is connected to the power input terminal of the power circuit 11 for rectifying an AC input voltage $V_{in}$ into a DC form. The input capacitor $C_{in}$ is interconnected between the power input terminal of the power circuit 11 and the first common terminal $COM_1$.

In addition to the control circuit 13a1 and the initiation circuit 13a2, the controlling unit 13a of FIG. 5 further comprises the accelerating circuit 13a3 and the eleventh resistor $R_{11}$. The accelerating circuit 13a3 is interconnected between the control terminal of the first switch element $Q_1$ and the control circuit 13a1 for accelerating operations of the first switch element $Q_1$. The accelerating circuit 13a3 comprises a fourth switch element $Q_4$, a twelfth resistor $R_{12}$, a thirteenth resistor $R_{13}$ and a fourteenth resistor $R_{14}$. A first terminal $Q_{4a}$ of the fourth switch element $Q_4$ is connected to the control terminal of the first switch element $Q_1$. The twelfth resistor $R_{12}$ is interconnected between the control terminal of the first switch element $Q_1$ and the control circuit 13a1. The thirteenth resistor $R_{13}$ is interconnected between the control terminal and the first terminal $Q_{4a}$ of the fourth switch element $Q_4$. The fourteenth resistor $R_{14}$ is interconnected between a second terminal of the fourth switch element $Q_4$ and the first common terminal $COM_1$. Once the pulse width modulation control signal $V_{PWM}$ is switched from the high-level status to a low-level (or zero) status, a discharging path is defined by the conducted fourth switch element $Q_4$ and the fourteenth resistor $R_{14}$, thereby increasing the discharging speed.

The feedback circuit 12a comprises the fifth resistor $R_5$, the sixth resistor $R_6$, the third capacitor $C_3$ and the fourth capacitor $C_4$. The fifth resistor $R_5$ is interconnected between the control terminal of the second switch element $Q_2$ and the system circuit 2. The sixth resistor $R_6$ is interconnected between the control terminal of the second switch element $Q_2$ and the second common terminal $COM_2$. The fifth resistor $R_5$ and the sixth resistor $R_6$ are serially connected with each other, thereby collectively defining an input voltage-division circuit. The power-status signal $V_{st}$ is subject to voltage division by the input voltage-division circuit, generating a divided voltage at the control terminal of the second switch element $Q_2$. The third capacitor $C_3$ is interconnected between the control terminal of the second switch element $Q_2$ and the second common terminal $COM_2$ for eliminating noise. The fourth capacitor $C_4$ is interconnected between the first reference terminal 121r and the cathode 121c of the three-terminal adjustable voltage regulator 121 for compensating the operative property of the three-terminal adjustable voltage regulator 121.

The initiation circuit 13a2 further comprises the tenth resistor $R_{10}$. The tenth resistor $R_{10}$ is interconnected between the second terminal $Q_{3b}$ and the control terminal of the third switch element $Q_3$. The tenth resistor $R_{10}$ could eliminate the noise contained in the control terminal of the third switch element $Q_3$, thereby preventing from erroneous operation of the third switch element $Q_3$. Similarly, the eleventh resistor $R_{11}$ is interconnected between the control terminal of the first switch element $Q_1$ and the first common terminal $COM_1$ for eliminating the noise contained in the control terminal of the first switch element $Q_1$, thereby preventing from erroneous operation of the first switch element $Q_1$.

Figure 6A:
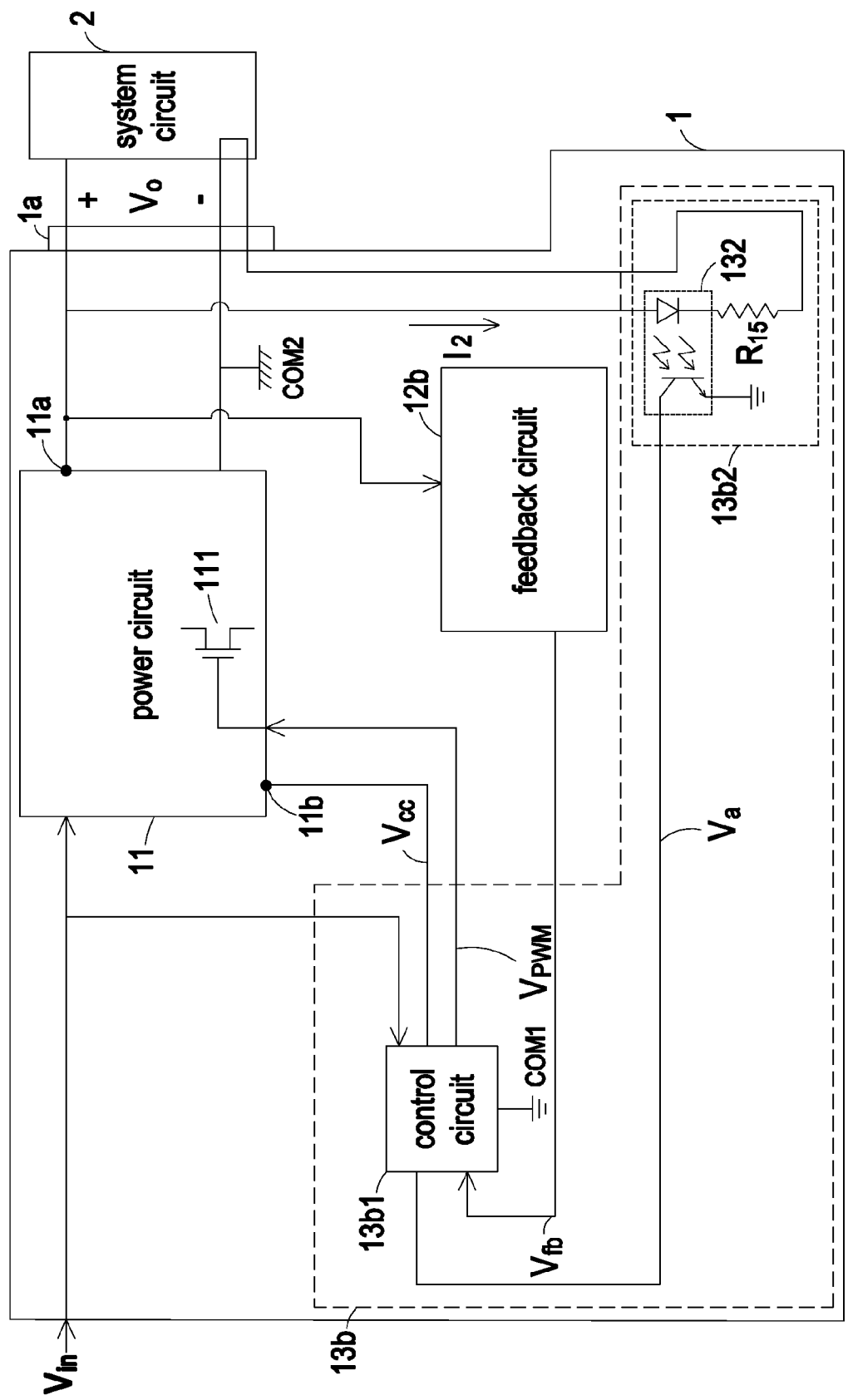
FIG. 6A is a schematic circuit diagram illustrating a portion of a switching power conversion circuit according to a third embodiment of the present invention.

FIG. 6A is a schematic circuit diagram illustrating a portion of a switching power conversion circuit according to a third embodiment of the present invention. In comparison with FIG. 1, the controlling unit 13b and the feedback circuit 12b of the switching power conversion circuit 1 of FIG. 6A are distinguished. In addition, the switching power conversion circuit 1 of FIG. 6A is connected with the system circuit 2 via a power connector 1a. According to the output voltage $V_o$, the feedback circuit 12a generates a feedback signal $V_{fb}$. The ratio of feedback signal $V_{fb}$ to the output voltage $V_o$ is constant but is not changed with the power-status signal $V_{st}$.

As shown in FIG. 6A, the controlling unit 13b comprises a control circuit 13b1 and a power-status detecting circuit 13b2. The power-status detecting circuit 13b2 is connected to the first power output terminal 11a of the power circuit 11, the control circuit 13b1 and the power connector 1a. The power-status detecting circuit 13b2 is used for discriminating whether electrical energy of the switching power conversion circuit 1 needs to be transmitted to the system circuit 2, thereby generating a power-status detecting signal $V_a$. The controlling unit 13b is connected to the power circuit 11, the control terminal of the first switching circuit 111 and the feedback circuit 12b. According to the power-status detecting signal $V_a$ and the feedback signal $V_{fb}$, the controlling unit 13b generates a pulse width modulation control signal $V_{PWM}$. According to the pulse width modulation control signal $V_{PWM}$, the first switching circuit 111 is conducted or shut off under control of the controlling unit 13b. As such, the input voltage $V_{in}$ is converted into the output voltage $V_o$ and the first auxiliary voltage $V_{cc}$.

The power-status detecting circuit 13b2 comprises a third isolating element 132 and a fifteenth resistor $R_{15}$. The output side of the third isolating element 132 is connected to the control circuit 13b1. The input side of the third isolating element 132 is serially connected to the fifteenth resistor $R_{15}$. A first end of the serially-connected set of the third isolating element 132 and the fifteenth resistor $R_{15}$ is connected to the first power output terminal 11a of the power circuit 11. A second end of the serially-connected set of the third isolating element 132 and the fifteenth resistor $R_{15}$ is connected to the system circuit 2 through the power connector 1a. If the power connector 1a is connected with the system circuit 2, the input side of the third isolating element 132, the fifteenth resistor $R_{15}$ and the system circuit 2 collectively define a loop. As such, the magnitude of a second current $I_2$ flowing into the third isolating element 132 is not zero. Correspondingly, the power-status detecting signal $V_a$ is in the zero-level status or low-level status. Whereas, if the power connector 1a is disconnected from the system circuit 2, the input side of the third isolating element 132, the fifteenth resistor $R_{15}$ and the system circuit 2 fail to define a loop. As such, the magnitude of a second current $I_2$ flowing into the third isolating element 132 is zero. Correspondingly, the power-status detecting signal $V_a$ is in the high-level status (i.e. an off status).

Figure 6B:
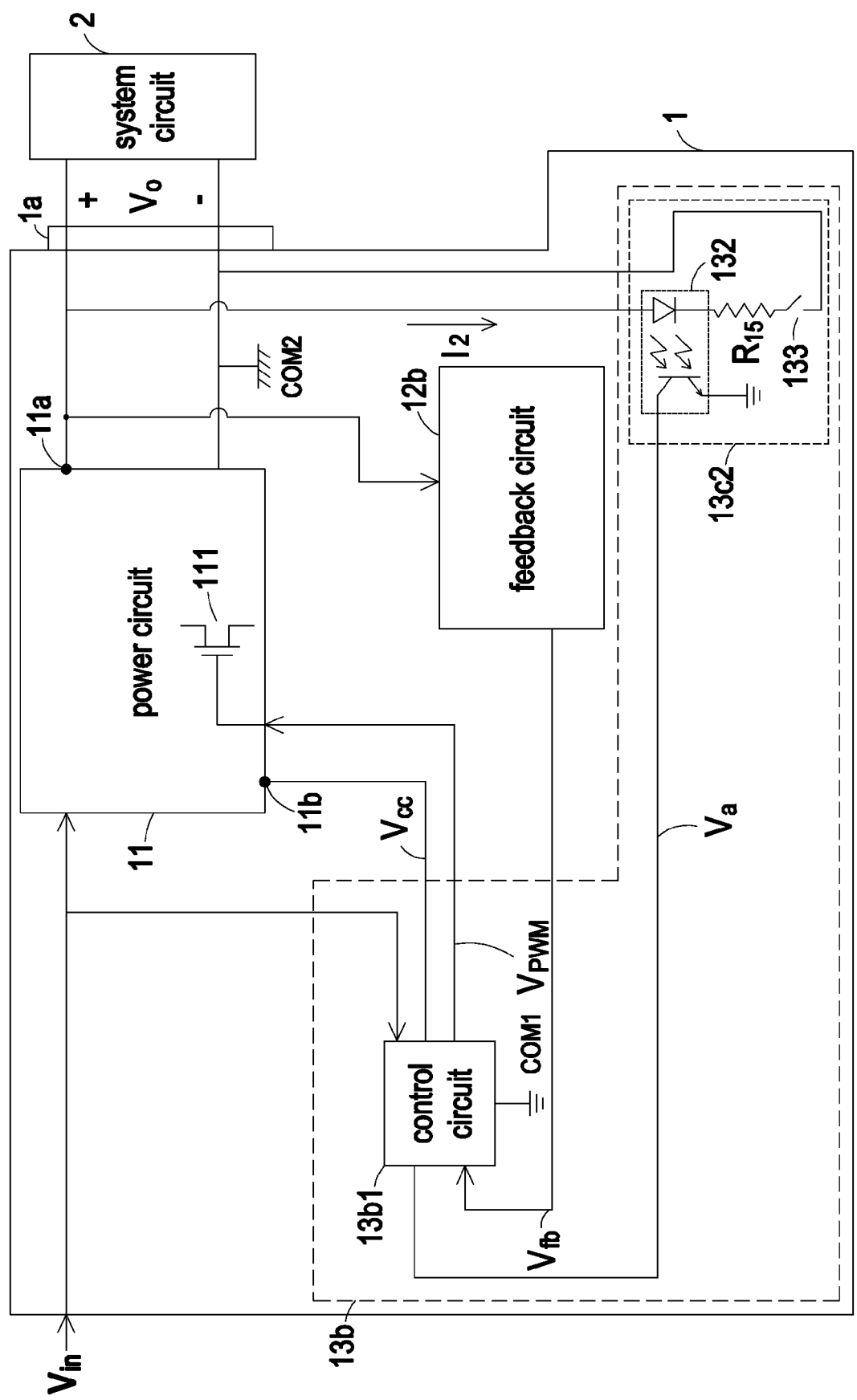
FIG. 6B is a schematic circuit diagram illustrating a portion of a switching power conversion circuit according to a fourth embodiment of the present invention.

FIG. 6B is a schematic circuit diagram illustrating a portion of a switching power conversion circuit according to a fourth embodiment of the present invention. In comparison with FIG. 6A, the power-status detecting circuit 13c2 of FIG. 6B further comprises a first linked switch element 133. The first linked switch element 133 is conducted or shut off according to the linking relation between the power connector 1a and the system circuit 2. In this embodiment, the input side of the third isolating element 132, the fifteenth resistor $R_{15}$ and the first linked switch element 133 are serially connected with each other. A first end of the serially-connected set of the third isolating element 132, the fifteenth resistor $R_{15}$ and the first linked switch element 133 is connected to the first power output terminal 11a of the power circuit 11. A second end of the serially-connected set of the third isolating element 132, the fifteenth resistor $R_{15}$ and the first linked switch element 133 is connected to the second common terminal $COM_2$.

If the power connector 1a is connected with the system circuit 2, the first linked switch element 133 is conducted, so that the input side of the third isolating element 132, the fifteenth resistor $R_{15}$ and the system circuit 2 collectively define a loop. As such, the magnitude of a second current $I_2$ flowing into the third isolating element 132 is not zero. Correspondingly, the power-status detecting signal $V_a$ is in the zero-level status or low-level status (i.e. an on status). Whereas, if the power connector 1a is disconnected from the system circuit 2, the first linked switch element 133 is shut off, so that the input side of the third isolating element 132, the fifteenth resistor $R_{15}$ and the system circuit 2 fail to define a loop. As such, the magnitude of a second current $I_2$ flowing into the third isolating element 132 is zero. Correspondingly, the power-status detecting signal $V_a$ is in the high-level status (i.e. an off status).

Figure 7:
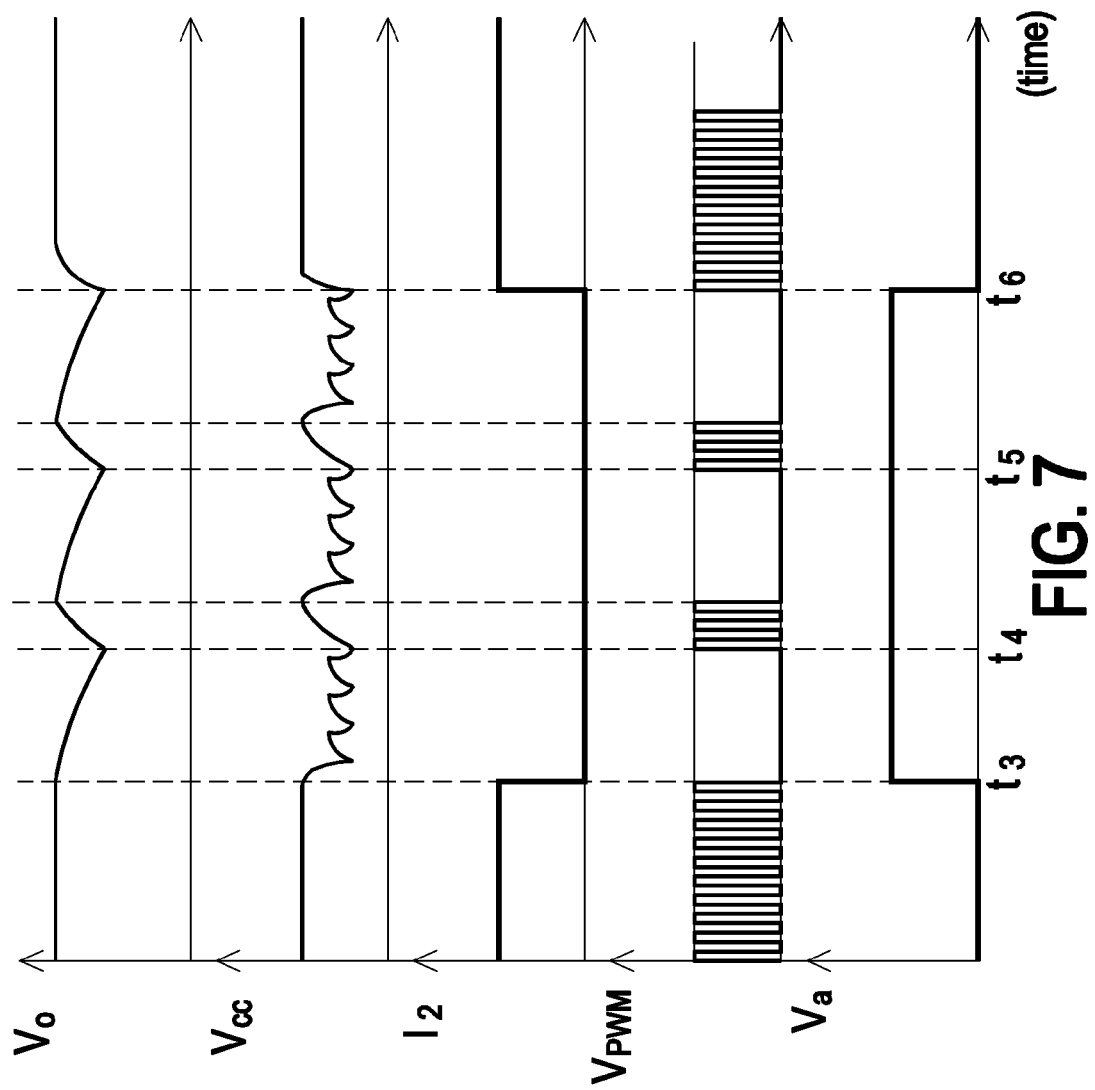
FIG. 7 is a timing waveform diagram schematically illustrating the corresponding voltage signals processed in the switching power conversion circuit of FIGS. 6A and 6B.

FIG. 7 is a timing waveform diagram schematically illustrating the corresponding voltage signals processed in the switching power conversion circuit of FIGS. 6A and 6B.

Before the time spot $t_3$, the power connector 1a is connected with the system circuit 2. As such, the magnitude of a second current $I_2$ flowing into the third isolating element 132 is not zero. Correspondingly, the power-status detecting signal $V_a$ is in the zero-level status or low-level status (i.e. an on status). According to the power-status detecting signal $V_a$ in the on status and the feedback signal $V_{fb}$, the control circuit 13b1 continuously generates the pulse width modulation control signal $V_{PWM}$. According to the pulse width modulation control signal $V_{PWM}$, the first switching circuit 111 is conducted or shut off under control of the control circuit 13c1. As such, the input voltage $V_{in}$ is converted into the output voltage $V_o$ and the first auxiliary voltage $V_c$.

At the time spot $t_3$, the power connector 1a is disconnected from the system circuit 2. As such, the magnitude of a second current $I_2$ flowing into the third isolating element 132 is zero. Correspondingly, the power-status detecting signal $V_a$ is in the high-level status (i.e. an off status). According to the power-status detecting signal $V_a$ in the off status, the control circuit 13b1 stops continuously generating the pulse width modulation control signal $V_{PWM}$. Similarly, from the time spot $t_3$ to the time spot $t_6$, the power-status detecting signal $V_a$ is in the off status. According to the power-status detecting signal $V_a$ in the off status, the control circuit 13b1 stops continuously generating the pulse width modulation control signal $V_{PWM}$. As such, the magnitudes of the output voltage $V_o$ and the first auxiliary voltage $V_{cc}$ fail to be maintained at the rated values.

From the time spot $t_3$ to the time spot $t_4$, the control circuit 13b1 stops generating the pulse width modulation control signal $V_{PWM}$. As such, the magnitude of the output voltage $V_o$ is reduced to be lower than its rated value. Under control of the control circuit 13b1, the electrical energy of the input voltage $V_{in}$ is intermittently transmitted to the second power output terminal 11b of the power circuit 11 through the control circuit 13b1. As such, the magnitude of the first auxiliary voltage $V_{cc}$ fluctuates up and down. From the time spot $t_4$ to the time spot $t_5$, the power-status detecting signal $V_a$ is in the off status. According to the power-status detecting signal $V_a$ in the off status, the control circuit 13b1 generates the pulse width modulation control signal $V_{PWM}$ in a short period. As such, the magnitudes of the output voltage $V_o$ and the first auxiliary voltage $V_{cc}$ are temporarily increased to be higher than their rated values.

At the time spot $t_6$, the power connector 1a is connected with the system circuit 2, so that the magnitude of a second current $I_2$ flowing into the third isolating element 132 is not zero. Correspondingly, the power-status detecting signal $V_a$ is in the on status. According to the power-status detecting signal $V_a$ in the on status and the feedback signal $V_{fb}$, the control circuit 13b1 continuously generates the pulse width modulation control signal $V_{PWM}$. According to the pulse width modulation control signal $V_{PWM}$, the first switching circuit 111 is conducted or shut off under control of the control circuit 13b1. As such, the magnitudes of the output voltage $V_o$ and the first auxiliary voltage $V_{cc}$ are maintained at their rated values.

From the time spot $t_3$ to the time spot $t_6$, the electrical energy of the switching power conversion circuit 1 does not need to be provided to the system circuit 2. According to the power-status detecting signal $V_a$ in the off status, the control circuit 13b1 stops continuously generating the pulse width modulation control signal $V_{PWM}$. As such, the magnitudes of the output voltage $V_o$ and the first auxiliary voltage $V_{cc}$ fail to be maintained at the rated values. In other words, the switching power conversion circuit 1 of the present invention is more power-saving. In this embodiment, since the power-status detecting signal $V_a$ is in the off status from the time spot $t_3$ to the time spot $t_6$, the magnitude of the power-status detecting signal $V_a$ is kept unchanged. In some embodiments, the magnitude of the power-status detecting signal $V_a$ may fluctuate up and down (not shown) from the time spot $t_3$ to the time spot $t_6$, but the magnitude of the power-status detecting signal $V_a$ is greater than a first threshold value (not shown). In other words, the control circuit 13b1 will discriminate that the power-status detecting signal $V_a$ is in the off status (i.e. the high-level status).

Figure 8A:
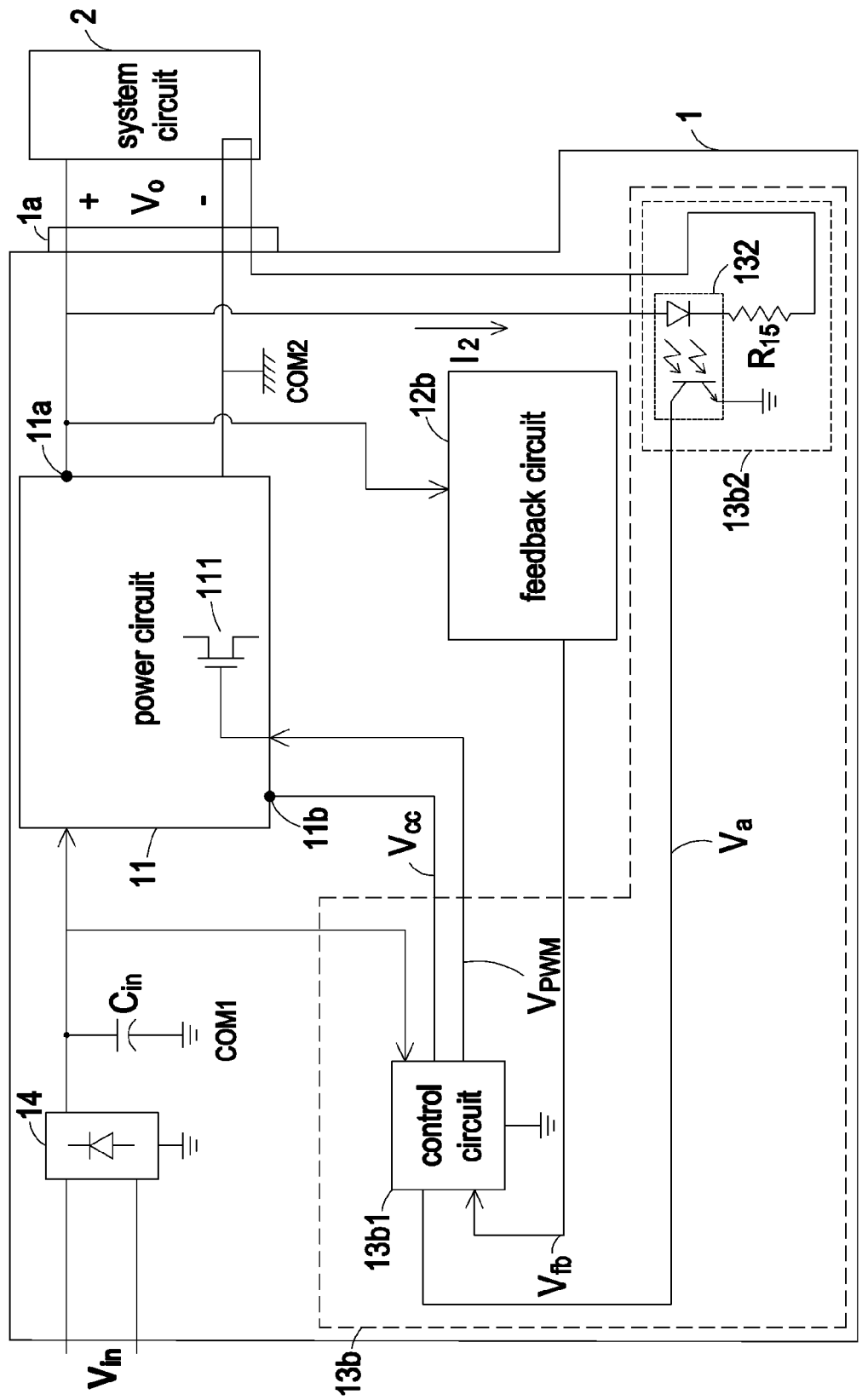
FIG. 8A is a schematic circuit diagram illustrating a portion of a switching power conversion circuit according to a fifth embodiment of the present invention.

FIG. 8A is a schematic circuit diagram illustrating a portion of a switching power conversion circuit according to a fifth embodiment of the present invention. In comparison with FIG. 6A, the switching power conversion circuit 1 of FIG. 8A further comprises an input rectifier circuit 14 and an input capacitor $C_{in}$. The input rectifier circuit 14 is connected to the power input terminal of the power circuit 11 for rectifying an AC input voltage $V_{in}$ into a DC form. The input capacitor $C_{in}$ is interconnected between the power input terminal of the power circuit 11 and the first common terminal $COM_1$.

Figure 8B:
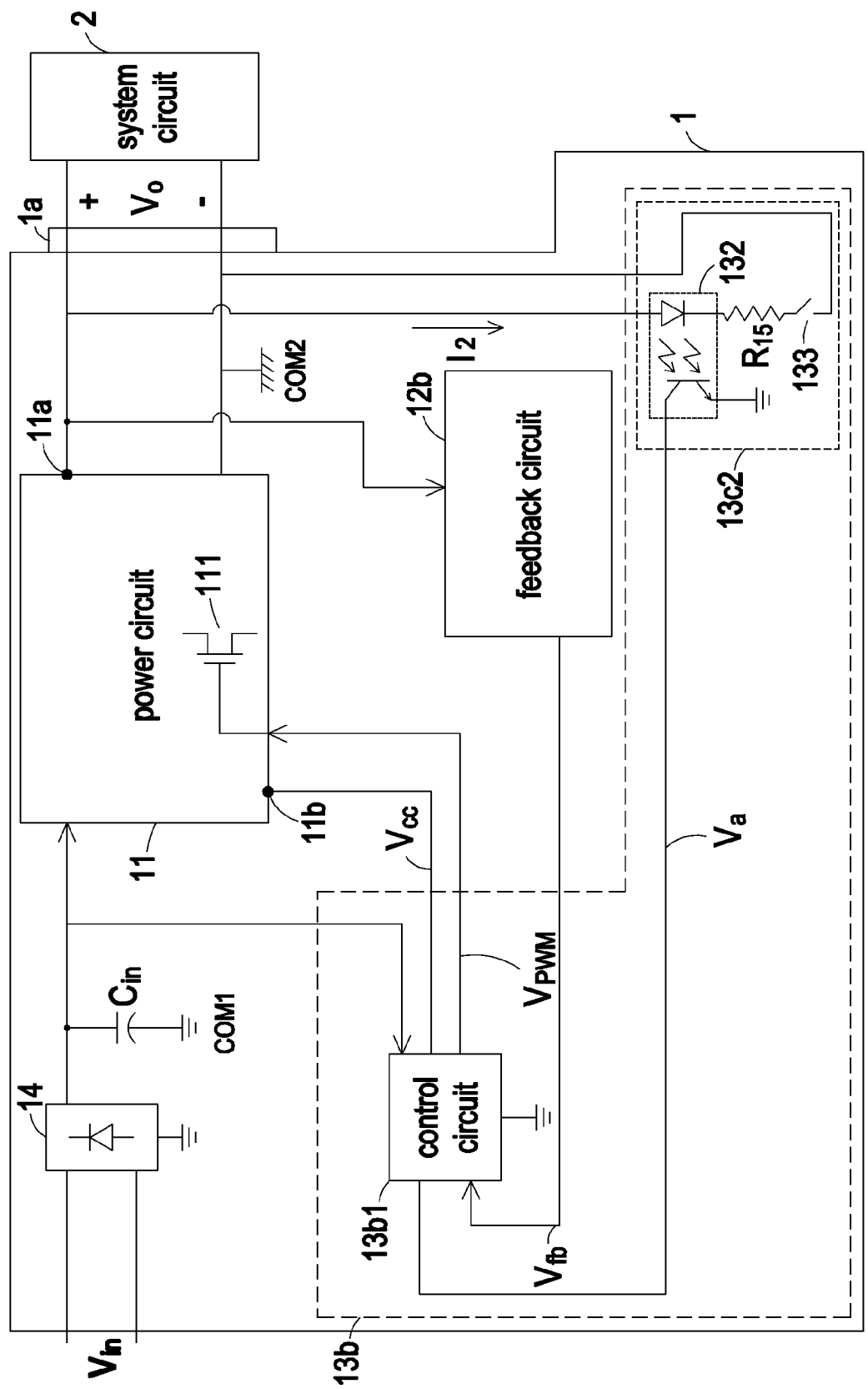
FIG. 8B is a schematic circuit diagram illustrating a portion of a switching power conversion circuit according to a sixth embodiment of the present invention.

FIG. 8B is a schematic circuit diagram illustrating a portion of a switching power conversion circuit according to a sixth embodiment of the present invention. In comparison with FIG. 6B, the switching power conversion circuit 1 of FIG. 8B further comprises an input rectifier circuit 14 and an input capacitor $C_{in}$. The input rectifier circuit 14 is connected to the power input terminal of the power circuit 11 for rectifying an AC input voltage $V_{in}$ into a DC form. The input capacitor $C_{in}$ is interconnected between the power input terminal of the power circuit 11 and the first common terminal $COM_1$.

Figure 9A:
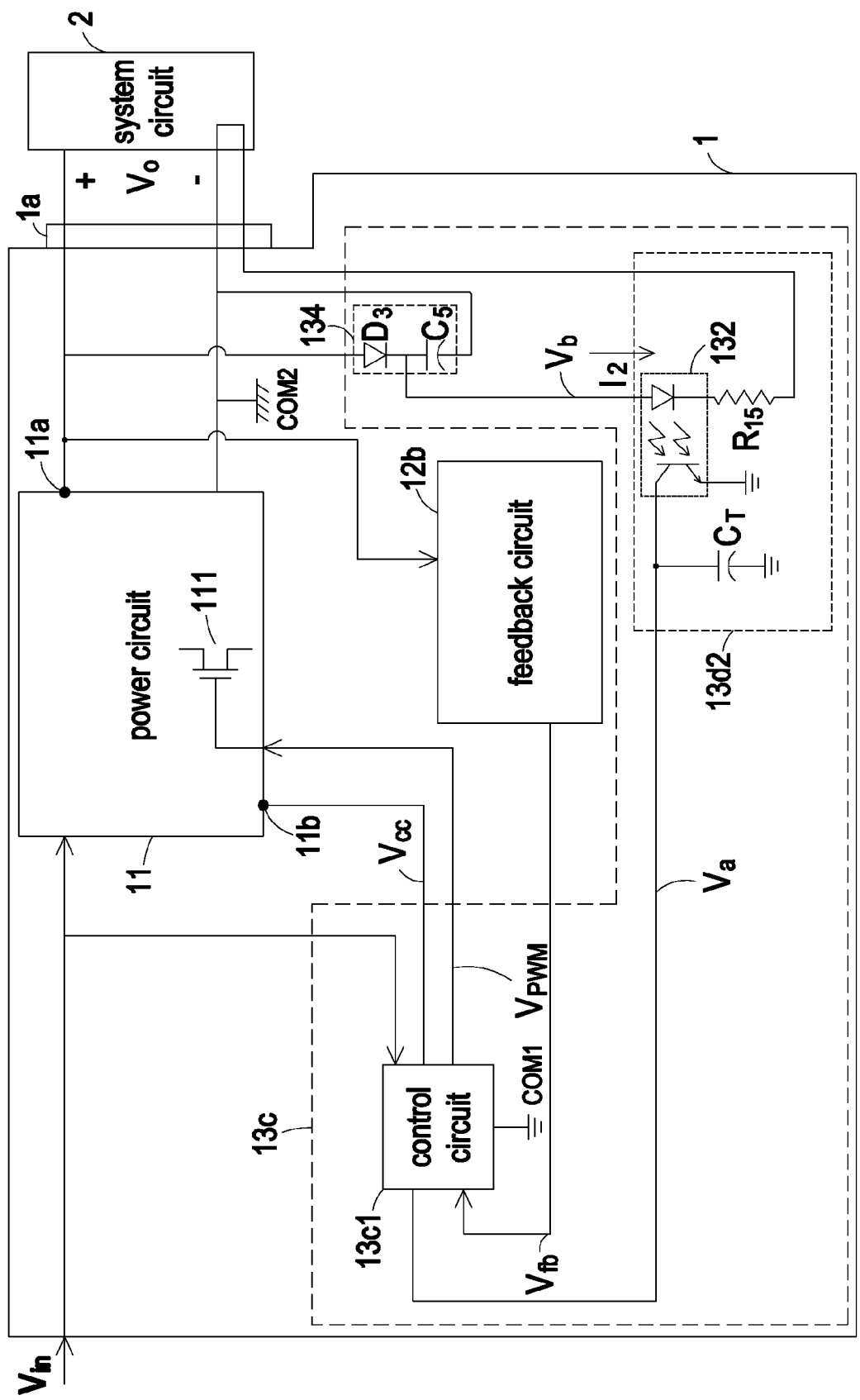
FIG. 9A is a schematic circuit diagram illustrating a portion of a switching power conversion circuit according to a seventh embodiment of the present invention.

FIG. 9A is a schematic circuit diagram illustrating a portion of a switching power conversion circuit according to a seventh embodiment of the present invention. In comparison with FIG. 6A, the control circuit 13c of the switching power conversion circuit 1 of FIG. 9A further comprises a holding circuit 134. The holding circuit 134 is connected to the first power output terminal 11a of the power circuit 11, the second common terminal COM$_2$ and the power-status detecting circuit 13d2. By the holding circuit 134, the electrical energy of the power circuit 11 is converted into a second auxiliary voltage V$_b$, which is transmitted to the power-status detecting circuit 13d2.

In this embodiment, the holding circuit 134 comprises a third diode D$_3$ and a fifth capacitor C$_5$. A first end of the fifth capacitor C$_5$ is connected to the second common terminal COM$_2$. A second end of the fifth capacitor C$_5$ is connected to the cathode of the third diode D$_3$. The anode of the third diode D$_3$ is connected to the first power output terminal 11a of the power circuit 11. The cathode of the third diode D$_3$ is connected to the power output terminal of the holding circuit 134. The power output terminal of the holding circuit 134 is connected to the power-status detecting circuit 13d2. In addition to the third isolating element 132 and a fifteenth resistor R$_{15}$, the power-status detecting circuit 13d2 further comprises a detecting capacitor C$_T$. The detecting capacitor C$_T$ is interconnected between the control circuit 13c1 and the first common terminal COM$_1$. The output side of the third isolating element 132 is connected to the control circuit 13c1. The input side of the third isolating element 132 is serially connected to the fifteenth resistor R$_{15}$. A first end of the serially-connected set of the third isolating element 132 and the fifteenth resistor R$_{15}$ is connected to the first power output terminal 11a of the power circuit 11. A second end of the serially-connected set of the third isolating element 132 and the fifteenth resistor R$_{15}$ is connected to the system circuit 2 through the power connector 1a.

If the power connector 1a is connected with the system circuit 2, the input side of the third isolating element 132, the fifteenth resistor R$_{15}$ and the system circuit 2 collectively define a loop. As such, the magnitude of a second current I$_2$ flowing into the third isolating element 132 is not zero. Correspondingly, the power-status detecting signal V$_a$ is in the zero-level status or low-level status. Whereas, if the power connector 1a is disconnected from the system circuit 2, the input side of the third isolating element 132, the fifteenth resistor R$_{15}$ and the system circuit 2 fail to define a loop. As such, the magnitude of a second current I$_2$ flowing into the third isolating element 132 is zero. Correspondingly, the power-status detecting signal V$_a$ is in the high-level status (i.e. an off status).

Figure 9B:
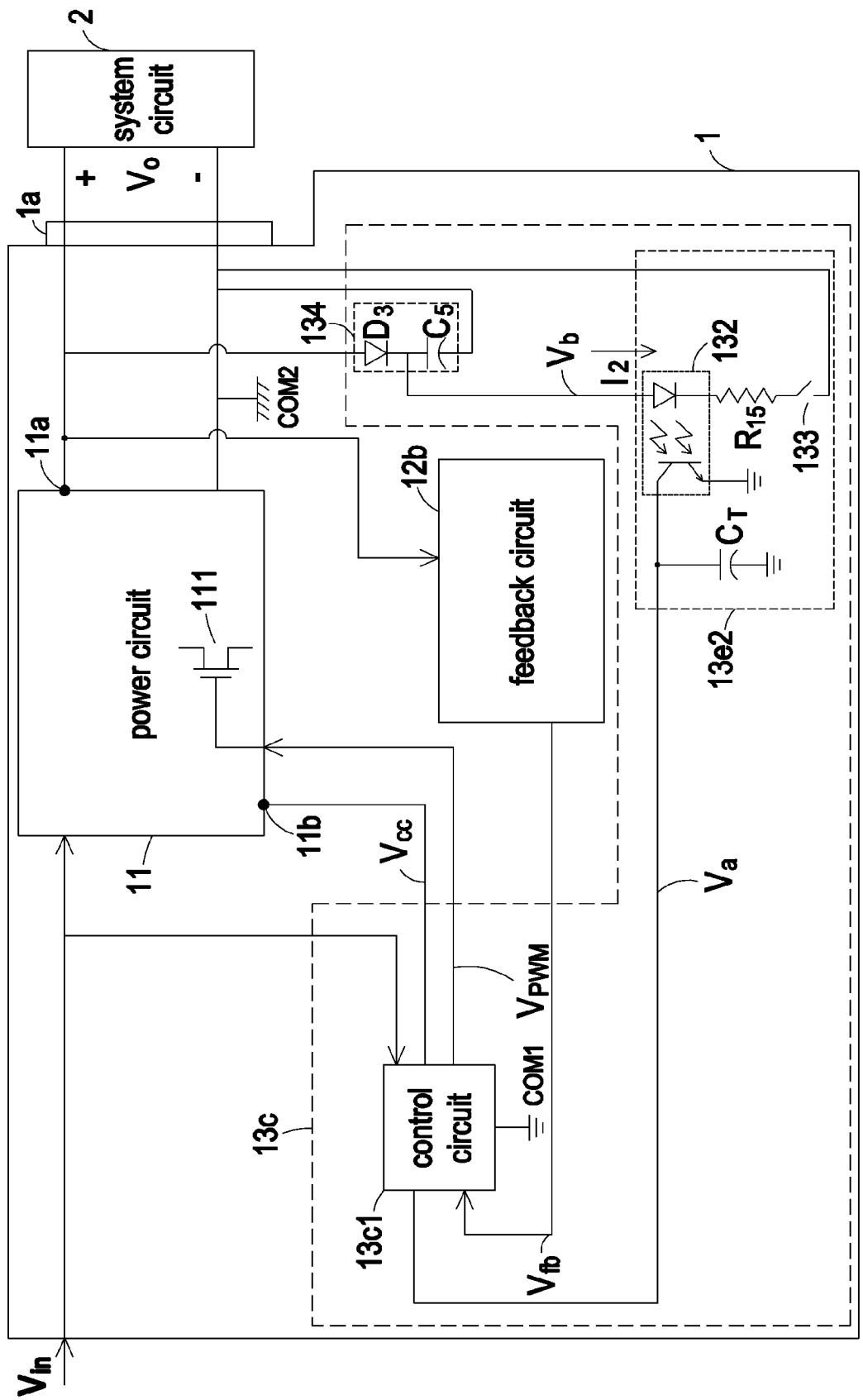
FIG. 9B is a schematic circuit diagram illustrating a portion of a switching power conversion circuit according to an eighth embodiment of the present invention.

FIG. 9B is a schematic circuit diagram illustrating a portion of a switching power conversion circuit according to an eighth embodiment of the present invention. In comparison with FIG. 9A, the power-status detecting circuit 13e2 of FIG. 9B further comprises a first linked switch element 133. The first linked switch element 133 is conducted or shut off according to the linking relation between the power connector 1a and the system circuit 2. In this embodiment, the input side of the third isolating element 132, the fifteenth resistor R$_{15}$ and the first linked switch element 133 are serially connected with each other. A first end of the serially-connected set of the third isolating element 132, the fifteenth resistor R$_{15}$ and the first linked switch element 133 is connected to the first power output terminal 11a of the power circuit 11. A second end of the serially-connected set of the third isolating element 132, the fifteenth resistor R$_{15}$ and the first linked switch element 133 is connected to the second common terminal COM$_2$.

If the power connector 1a is connected with the system circuit 2, the first linked switch element 133 is conducted, so that the input side of the third isolating element 132, the fifteenth resistor R$_{15}$ and the system circuit 2 collectively define a loop. As such, the magnitude of a second current I$_2$ flowing into the third isolating element 132 is not zero. Correspondingly, the power-status detecting signal V$_a$ is in the zero-level status or low-level status (i.e. an on status). Whereas, if the power connector 1a is disconnected from the system circuit 2, the first linked switch element 133 is shut off, so that the input side of the third isolating element 132, the fifteenth resistor R$_{15}$ and the system circuit 2 fail to define a loop. As such, the magnitude of a second current I$_2$ flowing into the third isolating element 132 is zero. Correspondingly, the power-status detecting signal V$_a$ is in the high-level status (i.e. an off status).

Figure 10:
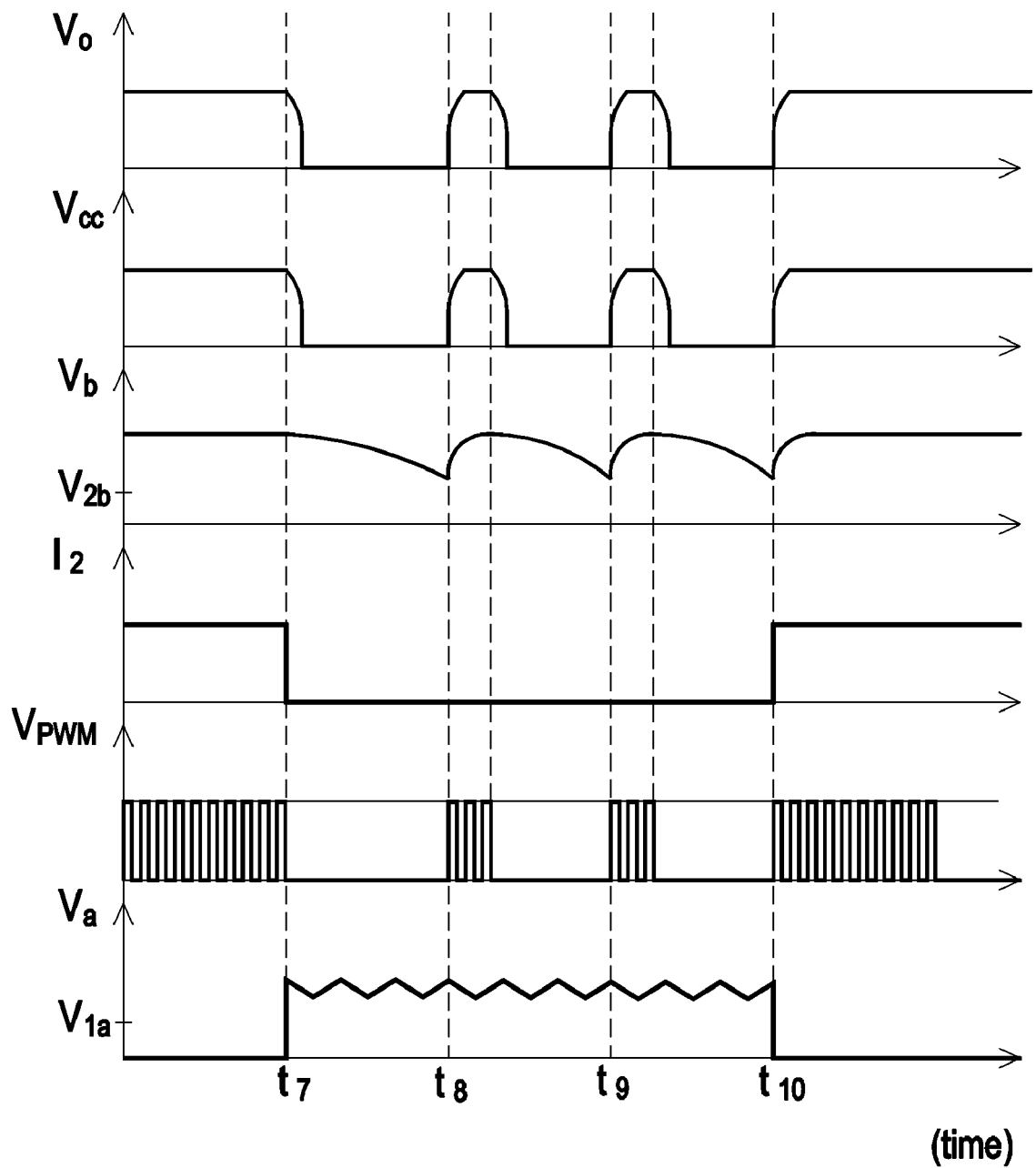
FIG. 10 is a timing waveform diagram schematically illustrating the corresponding voltage signals processed in the switching power conversion circuit of FIGS. 9A and 9B.

FIG. 10 is a timing waveform diagram schematically illustrating the corresponding voltage signals processed in the switching power conversion circuit of FIGS. 9A and 9B.

Before the time spot t$_7$, the power connector 1a is connected with the system circuit 2. As such, the magnitude of a second current I$_2$ flowing into the third isolating element 132 is not zero. Correspondingly, the power-status detecting signal V$_a$ is in the zero-level status or low-level status (i.e. an on status). According to the power-status detecting signal V$_a$ in the on status and the feedback signal V$_{fb}$, the control circuit 13c1 continuously generate the pulse width modulation control signal V$_{PWM}$. According to the pulse width modulation control signal V$_{PWM}$, the first switching circuit 111 is conducted or shut off under control of the control circuit 13c1. As such, the output voltage V$_o$, the first auxiliary voltage V$_{cc}$ and the second auxiliary voltage V$_b$ are maintained at their rated values.

At the time spot t$_7$, the power connector 1a is disconnected from the system circuit 2. As such, the magnitude of a second current I$_2$ flowing into the third isolating element 132 is zero. Correspondingly, the power-status detecting signal V$_a$ is in the high-level status (i.e. an off status). According to the power-status detecting signal V$_a$ in the off status, the control circuit 13b1 stops continuously generating the pulse width modulation control signal V$_{PWM}$. Similarly, from the time spot t$_7$ to the time spot t$_{10}$, the power-status detecting signal V$_a$ is in the off status. According to the power-status detecting signal V$_a$ in the off status, the control circuit 13b1 stops continuously generating the pulse width modulation control signal V$_{PWM}$. As such, the magnitudes of the output voltage V$_o$ and the first auxiliary voltage V$_{cc}$ fail to be maintained at the rated values.

From the time spot t$_7$ to the time spot t$_{10}$, the power-status detecting signal V$_a$ is in the off status. Under control of the control circuit 13c1, the electrical energy of the input voltage V$_{in}$ is intermittently transmitted to the detecting capacitor C$_T$ through the control circuit 13c1. As such, the magnitude of the power-status detecting signal V$_a$ is greater than the first threshold value V$_{1a}$. Although the magnitude of the power-status detecting signal V$_a$ fluctuates up and down during electrical energy is charged into the detecting capacitor C$_T$ or the detecting capacitor C$_T$ discharges, the magnitude of the power-status detecting signal V$_a$ is greater than the first threshold value V$_{1a}$. In other words, the control circuit 13c1 will discriminate that the power-status detecting signal V$_a$ is in the off status (i.e. the high-level status).

From the time spot t$_7$ to the time spot t$_8$, the control circuit 13c1 stops generating the pulse width modulation control signal V$_{PWM}$. As such, the magnitude of the output voltage V$_o$ is reduced to be lower than its rated value. However, by the holding circuit 134, the magnitude of the second auxiliary voltage $V_b$ is greater than a second threshold value $V_{2b}$. If the power connector 1a is connected with the system circuit 2, the holding circuit 134 will provide sufficient magnitude of the second auxiliary voltage $V_b$ to the power-status detecting circuit 13d2 or 13e2. As such, the power-status detecting signal $V_a$ is switched to the on status (i.e. the zero-level or low-level status).

For maintaining the magnitude of the second auxiliary voltage $V_b$ to be greater than the second threshold value $V_{2b}$, the power-status detecting signal $V_a$ is in the off status from the time spot $t_8$ to the time spot $t_9$. According to the power-status detecting signal $V_a$ in the off status, the control circuit 13c1 generates the pulse width modulation control signal $V_{PWM}$ in a short period. As such, the magnitudes of the output voltage $V_o$, the first auxiliary voltage $V_{cc}$ and the second auxiliary voltage $V_b$ are temporarily increased to be higher than their rated values. At the same time, the holding circuit 134 provides electrical energy to the fifth capacitor $C_5$, so that the magnitude of the second auxiliary voltage $V_b$ is maintained to be greater than the second threshold value $V_{2b}$. Since the time interval between time spot $t_7$ and the time spot $t_8$, the time interval between time spot $t_8$ and the time spot $t_9$ and the time interval between time spot $t_9$ and the time spot $t_{10}$ are relatively longer, the magnitudes of the output voltage $V_o$ and the first auxiliary voltage $V_{cc}$ may fall down to zero.

At the time spot $t_{10}$, the power connector 1a is connected with the system circuit 2, so that the magnitude of a second current $I_2$ flowing into the third isolating element 132 is not zero. Correspondingly, the power-status detecting signal $V_a$ is in the on status. According to the power-status detecting signal $V_a$ in the on status and the feedback signal $V_{fb}$, the control circuit 13c1 continuously generate the pulse width modulation control signal $V_{PWM}$. According to the pulse width modulation control signal $V_{PWM}$, the first switching circuit 111 is conducted or shut off under control of the control circuit 13c1. As such, the magnitudes of the output voltage $V_o$, the first auxiliary voltage $V_{cc}$ and the second auxiliary voltage $V_b$ are maintained at their rated values.

From the time spot $t_7$ to the time spot $t_{10}$, the electrical energy of the switching power conversion circuit 1 does not need to be provided to the system circuit 2. According to the power-status detecting signal $V_a$ in the off status, the control circuit 13c1 stops continuously generating the pulse width modulation control signal $V_{PWM}$. As such, the magnitudes of the output voltage $V_o$ and the first auxiliary voltage $V_{cc}$ will be reduced to zero. In other words, the switching power conversion circuit 1 of the present invention is more power-saving.

Figure 11A:
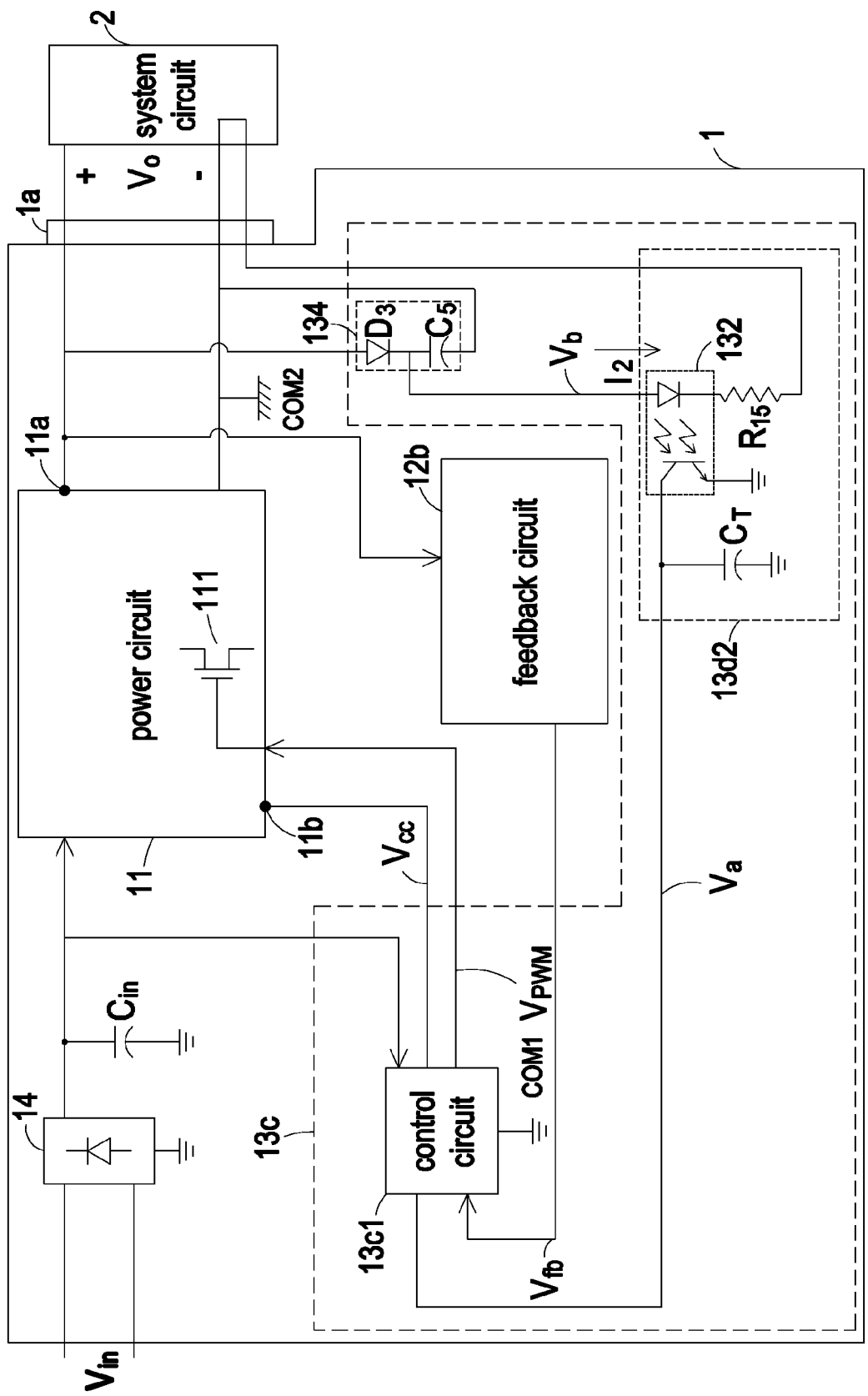
FIG. 11A is a schematic circuit diagram illustrating a portion of a switching power conversion circuit according to a ninth embodiment of the present invention.

FIG. 11A is a schematic circuit diagram illustrating a portion of a switching power conversion circuit according to a ninth embodiment of the present invention. In comparison with FIG. 9A, the switching power conversion circuit 1 of FIG. 11A further comprises an input rectifier circuit 14 and an input capacitor $C_{in}$. The input rectifier circuit 14 is connected to the power input terminal of the power circuit 11 for rectifying an AC input voltage $V_{in}$ into a DC form. The input capacitor $C_{in}$ is interconnected between the power input terminal of the power circuit 11 and the first common terminal $COM_1$.

Figure 11B:
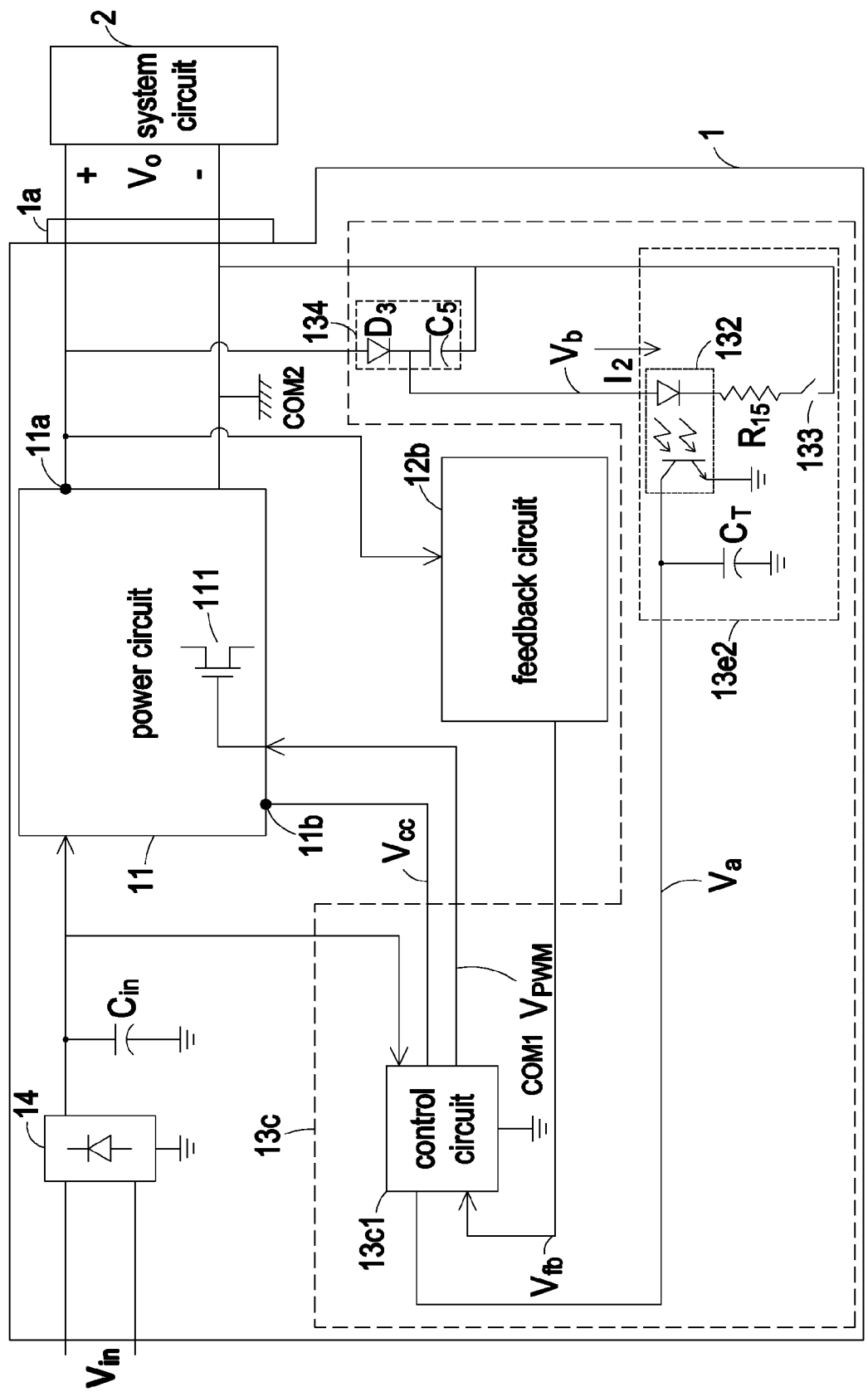
FIG. 11B is a schematic circuit diagram illustrating a portion of a switching power conversion circuit according to a tenth embodiment of the present invention.

FIG. 11B is a schematic circuit diagram illustrating a portion of a switching power conversion circuit according to a tenth embodiment of the present invention. In comparison with FIG. 9B, the switching power conversion circuit 1 of FIG. 11A further comprises an input rectifier circuit 14 and an input capacitor $C_{in}$. The input rectifier circuit 14 is connected to the power input terminal of the power circuit 11 for rectifying an AC input voltage $V_{in}$ into a DC form. The input capacitor $C_{in}$ is interconnected between the power input terminal of the power circuit 11 and the first common terminal $COM_1$.

Figure 12:
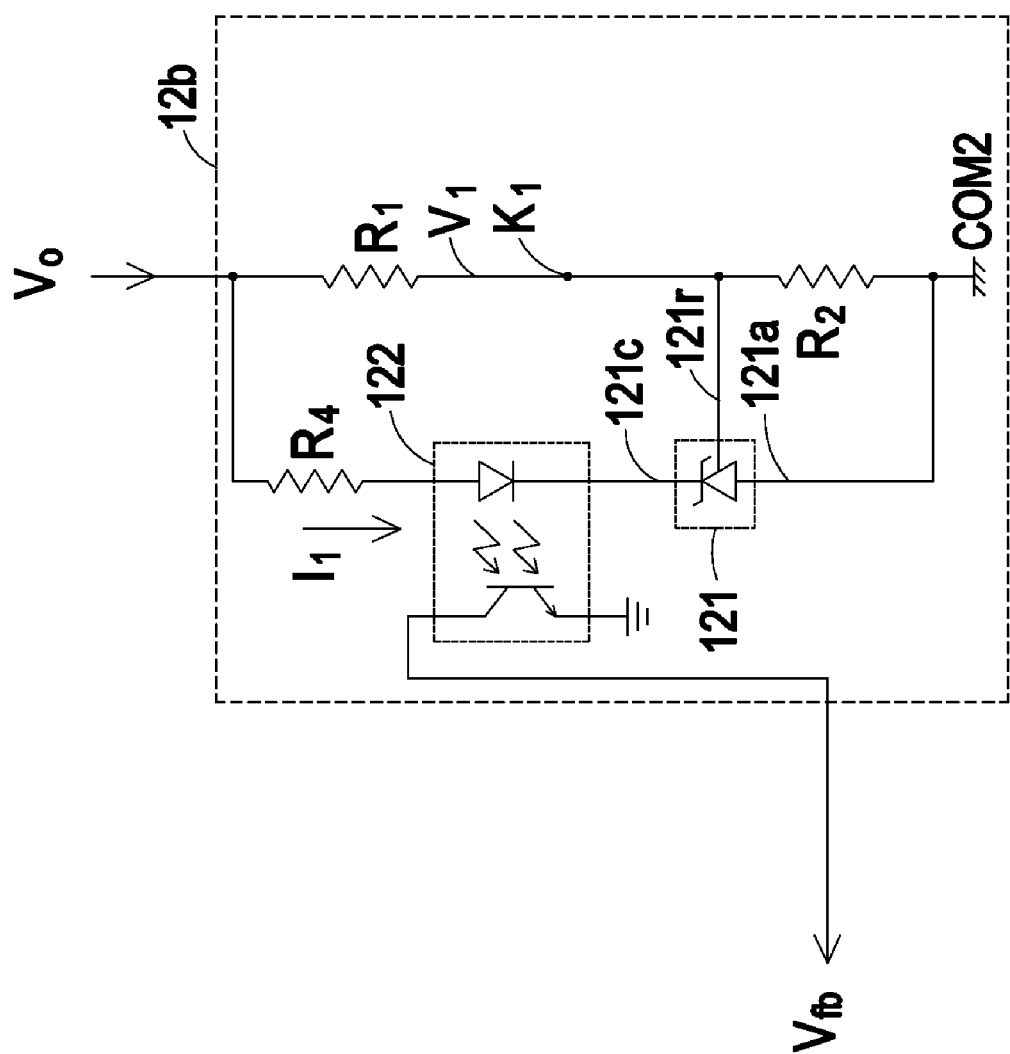
FIG. 12 is a schematic circuit diagram illustrating a portion of a switching power conversion circuit according to an eleventh embodiment of the present invention.

FIG. 12 is a schematic circuit diagram illustrating a portion of a switching power conversion circuit according to an eleventh embodiment of the present invention. Except that the third resistor R3 and the second switch element Q2 are not included in the feedback circuit 12b, the components of the switching power conversion circuit of FIG. 12 are identical to those of FIG. 3.

In the above embodiments, the control circuits 13a1, 13b1 and 13c1 are illustrated by referring to PWM controllers. I Nevertheless, the control circuits 13a1, 13b1 and 13c1 could be pulse frequency modulation (PFM) controllers or digital signal processors (DSPs). Each of the switch elements includes but is not limited to a bipolar junction transistor (BJT) or a metal oxide semiconductor field effect transistor (MOSFET).

From the above description, the switching power conversion circuit of the present invention could meet the power-saving requirement. In a case that the electrical energy of the switching power conversion circuit 1 needs not to be provided to the system circuit, the control circuit is disabled according to the feedback signal issued by the feedback circuit and the initiation voltage issued by the initiation circuit. Once the control circuit is disabled, the switching power conversion circuit could be disabled. Moreover, the power-status detecting circuit of the controlling unit generates a power-status detecting signal according to the power status of the system circuit. According to the power-status detecting signal, the control circuit 1 is intermittently enabled, so that the magnitude of the output voltage is not maintained at the rated value (or zero). In other words, the switching power conversion circuit of the present invention will be adaptively disabled without the need of adjusting the magnitude of the input voltage to be zero or interrupting the input voltage. As a consequence, the switching power conversion circuit of the present invention could achieve a power-saving purpose. Moreover, the switching power conversion circuit of the present invention could be applied to a power supply. When the electronic device in not in use, the power supply is disabled and thus the power supply does not need to be disconnected from the power socket to interrupt the input voltage. In other words, the power supply of the present invention could also achieve a power-saving purpose.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A switching power conversion circuit for receiving an input voltage and generating an output voltage to a system circuit, said switching power conversion circuit comprising:
  a power circuit comprising a first switch circuit, wherein said input voltage is converted into said output voltage and a first auxiliary voltage by alternately conducting and shutting off said first switching circuit;
  a feedback circuit connected to said power circuit for generating a feedback signal according to a power-status signal issued by said system circuit and said output voltage;

a control circuit connected to said first switching circuit and said feedback circuit, wherein said first switching circuit is conducted or shut off according to said feedback signal under control of said control circuit, so that said input voltage is converted into said output voltage and said first auxiliary voltage by said power circuit; and an initiation circuit connected to said system circuit and said control circuit, wherein an initiation voltage is issued by said initiation circuit according to said power-status signal, wherein if said power-status signal is in an off status, a ratio of said feedback signal to said output voltage is equal to a first feedback ratio and the magnitude of said first auxiliary voltage is lower than a normal operating voltage value, so that said control circuit is disabled.

2. The switching power conversion circuit according to claim 1 wherein said initiation voltage is zero when said power-status signal is in said off status.

3. The switching power conversion circuit according to claim 1 wherein if said power-status signal is in an on status, said control circuit is enabled according to said initiation voltage issued by said initiation circuit, and a ratio of said feedback signal to said output voltage is equal to a second feedback ratio, so that the magnitude of said output voltage and said first auxiliary voltage are maintained at the rated values thereof.

4. The switching power conversion circuit according to claim 3 wherein said first feedback ratio is greater than said second feedback ratio.

5. The switching power conversion circuit according to claim 1 wherein said power circuit comprises:
a transformer comprising a primary winding coil, a secondary winding coil and an auxiliary winding coil;
a first rectifier and filter circuit interconnected between said secondary winding coil of said transformer and said system circuit; and
a second rectifier and filter circuit interconnected between said auxiliary winding coil of said transformer and said control circuit,
wherein by conducting or shutting off said first switching circuit, electrical energy of said input voltage is transmitted to said secondary winding coil and said auxiliary winding coil of said transformer and respectively rectified and filtered by said first rectifier and filter circuit, thereby generating said output voltage and said first auxiliary voltage.

6. The switching power conversion circuit according to claim 5 wherein said power circuit further comprises a current-detecting circuit coupled to said first switch circuit for detecting the magnitude of current flowing through said first switch circuit and generating a corresponding current-detecting signal to said control circuit.

7. The switching power conversion circuit according to claim 1 wherein said feedback circuit comprises:
a first resistor interconnected between said power circuit and a first connecting node;
a second resistor connected to said first connecting node, wherein said first resistor and said second resistor are serially connected with each other to define a first voltage-division circuit for allowing the output voltage to be divided and generating a first divided voltage at said first connecting node;
a first isolating element having an output side connected to said control circuit for generating a corresponding feedback signal according to the magnitude of a first current flowing into an input side thereof;
a three-terminal adjustable voltage regulator coupled to said first connecting node for automatically adjusting the magnitude of said first current according to said first divided voltage and a first reference voltage value thereof and allowing the output side of said first isolating element to generate said feedback signal according to said output voltage;
a second switch circuit having a control terminal connected to said system circuit;
a third resistor, said third resistor and said second switch circuit being interconnected between the both terminals of said second resistor, wherein when said second switch circuit is conducted in response to said power-status signal in an on status, the third resistor and the second resistor are connected with each other in parallel; and
a fourth resistor, said fourth resistor and said input side of said first isolating element are serially interconnected between a cathode of said three-terminal adjustable voltage regulator and said power circuit for limiting the magnitude of said first current.

8. The switching power conversion circuit according to claim 7 wherein said feedback circuit further comprises:
a fifth resistor interconnected between said control terminal of said second switch circuit and said system circuit; and
a sixth resistor interconnected between said control terminal of said second switch circuit, wherein said fifth resistor and said sixth resistor are serially connected with each other to define an input voltage-division circuit for allowing the voltage of said power-status signal to be divided.

9. The switching power conversion circuit according to claim 1 wherein said initiation circuit comprises:
a seventh resistor interconnected between said power circuit and a second connecting node;
an eighth resistor connected to said second connecting node, wherein said seventh resistor and said eighth resistor are serially connected with each other to define a second voltage-division circuit for allowing the input voltage to be divided and generating a second divided voltage at said second connecting node;
a third switch circuit having a first terminal connected to said power circuit and a second terminal connected to said control circuit;
a second isolating element having an output side interconnected to a control terminal of said third switch circuit and said second connecting node; and
a ninth resistor, said ninth resistor and an input side of said second isolating element being serially connected to said system circuit;
wherein when said power-status signal is in an on status, said second divided voltage is transmitted to said control terminal of said third switch circuit through said output side of said second isolating element, so that the electrical energy of said input voltage is transmitted to said control circuit and said control circuit is enabled; and when said power-status signal is in an off status, said control circuit is disabled.

10. The switching power conversion circuit according to claim 9 wherein said initiation circuit further comprises:
a tenth resistor interconnected between said second terminal and said control terminal of said third switch element; and
an eleventh resistor interconnected between a control terminal of said first switch circuit.

11. The switching power conversion circuit according to claim 1 further comprising an accelerating circuit, which is interconnected between a control terminal of said first switch circuit and said control circuit for accelerating operations of said first switch circuit.

12. The switching power conversion circuit according to claim 11 wherein said accelerating circuit comprises:
   a fourth switch circuit having a first terminal connected to said control terminal of said first switch circuit;
   a twelfth resistor interconnected between said control terminal of said first switch circuit and said control circuit;
   a thirteenth resistor interconnected between said control terminal and said first terminal of said fourth switch circuit; and
   a fourteenth resistor interconnected between a second terminal of said fourth switch circuit;
   wherein when the pulse width modulation control signal is switched from a high-level status to a low-level status, a discharging path is defined by the conducted fourth switch circuit and the fourteenth resistor.

13. The switching power conversion circuit according to claim 1 further comprising:
   an input rectifier circuit connected to a power input terminal of said power circuit for rectifying said input voltage; and
   an input capacitor connected to said power input terminal of said power circuit.

14. A switching power conversion circuit for receiving an input voltage and generating an output voltage, said output voltage being transmitted to a system circuit of an electronic device through a power connector, said switching power conversion circuit comprising:
   a power circuit comprising a first switch circuit, wherein said input voltage is converted into said output voltage and a first auxiliary voltage by alternately conducting and shutting off said first switching circuit, and said output voltage and said first auxiliary voltage are respectively outputted from a first power output terminal and a second power output terminal of said power circuit;
   a feedback circuit connected to said power circuit for generating a feedback signal according to said output voltage;
   a power-status detecting circuit connected to said first power output terminal of said power circuit for discriminating whether electrical energy of said switching power conversion circuit needs to be transmitted to said system circuit, thereby generating a corresponding power-status detecting signal; and
   a control circuit connected to said first switching circuit, said feedback circuit and said power-status detecting circuit, wherein said control circuit generates a pulse width modulation control signal according to said power-status detecting signal and said feedback signal, said first switching circuit is conducted or shut off according to said pulse width modulation control signal under control of said control circuit, so that said input voltage is converted into said output voltage and said first auxiliary voltage by said power circuit,
   wherein when said power-status detecting signal is in an off status, said first control circuit is disabled or intermittently enabled, so that the magnitudes of said output voltage and said first auxiliary voltage are lower than the rated values thereof or equal to zero.

15. The switching power conversion circuit according to claim 14 wherein said power-status detecting signal is in an on status when said power connector is connected with said system circuit, and said power-status detecting signal is in said off status when said power connector is disconnected from said system circuit.

16. The switching power conversion circuit according to claim 15 wherein when said power-status detecting signal is in said off status, said control circuit stops continuously generating said pulse width modulation control signal, so that the magnitudes of said output voltage and said first auxiliary voltage are not maintained at the rated values thereof.

17. The switching power conversion circuit according to claim 15 wherein when said power-status detecting signal is in said off status, said control circuit generates said pulse width modulation control signal in a relatively short period, so that the magnitudes of said output voltage and said first auxiliary voltage are temporarily increased to be higher than the rated values thereof.

18. The switching power conversion circuit according to claim 15 wherein when said power-status detecting signal is in said off status, electrical energy of said input voltage is intermittently transmitted to said second power output terminal of said power circuit under control of said control circuit, so that the magnitude of said first auxiliary voltage fluctuates up and down.

19. The switching power conversion circuit according to claim 15 further comprising a holding circuit interconnected between said first power output terminal of said power circuit and said power-status detecting circuit for receiving electrical energy of said power circuit, thereby generating a second auxiliary voltage to said power-status detecting circuit, wherein when said power-status detecting signal is in said off status, said control circuit generates said pulse width modulation control signal in a relatively short period, so that the magnitude of said second auxiliary voltage is temporarily increased to be higher than a threshold value.

20. The switching power conversion circuit according to claim 14 further comprising:
   an input rectifier circuit connected to a power input terminal of said power circuit for rectifying said input voltage; and
   an input capacitor connected to said power input terminal of said power circuit.

21. A switching power conversion circuit for receiving an input voltage and generating an output voltage to a system circuit, said switching power conversion circuit comprising:
   a power circuit comprising a first switch circuit, wherein said input voltage is converted into said output voltage and a first auxiliary voltage by alternately conducting and shutting off said first switching circuit, and said output voltage and said first auxiliary voltage are respectively outputted from a first power output terminal and a second power output terminal of said power circuit;
   a feedback circuit connected to said power circuit for generating a feedback signal according to said output voltage; and
   a controlling unit connected to said first switching circuit and said feedback circuit for controlling said first switching circuit to be conducted or shut off according to said feedback signal and on/off statuses of said system circuit, so that said input voltage is converted into said output voltage and said first auxiliary voltage by said power circuit,
   wherein when said system circuit is in an off status, said first control circuit is disabled or intermittently enabled, so that the magnitudes of said output voltage and said first auxiliary voltage are lower than the rated values thereof or equal to zero.

22. The switching power conversion circuit according to claim 21 wherein said controlling unit comprises a control circuit connected to said first switching circuit and said feedback circuit, and said first switching circuit for controlling said first switching circuit to be conducted or shut off according to said feedback signal, so that said input voltage is converted into said output voltage and said first auxiliary voltage by said power circuit.

23. The switching power conversion circuit according to claim 22 wherein said feedback circuit is further connected to said system circuit, and said feedback circuit generates said feedback signal according to a power-status signal issued by said system circuit and said output voltage.

24. The switching power conversion circuit according to claim 23 wherein said controlling unit comprises an initiation circuit connected to said system circuit and said control circuit, wherein an initiation voltage is issued by said initiation circuit according to said power-status signal of said system circuit, wherein when said power-status signal is in said off status, a ratio of said feedback signal to said output voltage is equal to a first feedback ratio and the magnitude of said first auxiliary voltage is lower than a normal operating voltage value, so that said control circuit is disabled.

25. The switching power conversion circuit according to claim 21 further comprising:
   an input rectifier circuit connected to a power input terminal of said power circuit for rectifying said input voltage; and
   an input capacitor connected to said power input terminal of said power circuit.

26. A power supply, comprising:
   a switching power conversion circuit for receiving an input voltage and generating an output voltage, said output voltage being transmitted to a system circuit of an electronic device through a power connector, said switching power conversion circuit comprising:
   a power circuit comprising a first switch circuit, wherein said input voltage is converted into said output voltage and a first auxiliary voltage by alternately conducting and shutting off said first switching circuit, and said output voltage and said first auxiliary voltage are respectively outputted from a first power output terminal and a second power output terminal of said power circuit;
   a feedback circuit connected to said power circuit for generating a feedback signal according to said output voltage; and
   a controlling unit connected to said first switching circuit, said system circuit and said feedback circuit for controlling said first switching circuit to be conducted or shut off according to said feedback signal and on/off statuses or power-status of said system circuit, so that said input voltage is converted into said output voltage and said first auxiliary voltage by said power circuit,
   wherein when said power-status of said system circuit is in an off status, said controlling unit controls said first switching circuit to stop operating or to be alternately conducted and shut off, so that the magnitudes of said output voltage and said first auxiliary voltage are lower than the rated values thereof or equal to zero.

* * * * *